United States Patent
Christiaens et al.

(10) Patent No.: US 9,111,102 B2
(45) Date of Patent: Aug. 18, 2015

(54) CREATION OF SECURITY ROLES THROUGH USER WALKTHROUGH OF BUSINESS PROCESS WORKFLOW

(71) Applicant: Microsoft Technology Licensing, LLC, Redmond, WA (US)

(72) Inventors: Gregory Christiaens, Bellevue, WA (US); Parth Pandya, Sammamish, WA (US); Sudhakara Reddy Peddi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 13/668,315

(22) Filed: Nov. 4, 2012

(65) Prior Publication Data

US 2014/0082689 A1 Mar. 20, 2014

Related U.S. Application Data

(60) Provisional application No. 61/701,844, filed on Sep. 17, 2012.

(51) Int. Cl.
*G06F 7/04* (2006.01)
*G06F 15/16* (2006.01)
*G06F 17/30* (2006.01)
*H04L 29/06* (2006.01)
*G06F 21/60* (2013.01)

(52) U.S. Cl.
CPC .................................... *G06F 21/604* (2013.01)

(58) Field of Classification Search
CPC ......... H04L 63/20; H04L 63/10; G06F 21/62; G06F 21/604; G06Q 10/10

USPC .................................. 713/1; 726/1–4, 27–29
See application file for complete search history.

(56) References Cited

U.S. PATENT DOCUMENTS

| 6,088,679 A | 7/2000 | Barkley | |
|---|---|---|---|
| 6,434,607 B1 | 8/2002 | Haverstock | |
| 8,386,779 B2 * | 2/2013 | King et al. | 713/167 |
| 2009/0132995 A1 * | 5/2009 | Iborra et al. | 717/106 |
| 2010/0050252 A1 * | 2/2010 | King et al. | 726/21 |
| 2010/0223557 A1 * | 9/2010 | Kenney et al. | 715/736 |
| 2011/0252333 A1 | 10/2011 | Porcari | |
| 2014/0013440 A1 * | 1/2014 | Thakur et al. | 726/27 |

OTHER PUBLICATIONS

"Security Development Tool User Guide [AX 2012]", Retrieved at <<http://technet.microsoft.com/en-us/library/hh859729.aspx>>, Retrieved Date : Oct. 4, 2012, pp. 1.
"Symposium on Interaction with Smart Artifacts", Retrieved at <<http://old.hcilab.org/events/jpde/program/talks>>, Mar. 7, 2011, pp. 8.
"Using Event Logs to Derive Role Engineering Artifacts", Retrieved at <<http://www.sba-research.org/wp-content/uploads/publications/230_paper_4025.pdf>>, Apr. 2011, pp. 6.
"15 Customizing Security for ADF Application Artifacts", Retrieved at <<http://docs.oracle.com/cd/E28271_01/fusionapps.1111/e16691/ext_secdt.htm>>, Retrieved Date: Oct. 4, 2012, pp. 32.

* cited by examiner

*Primary Examiner* — Eleni Shiferaw
*Assistant Examiner* — Jing Sims
(74) *Attorney, Agent, or Firm* — Damon Rieth; Jim Ross; Micky Minhas

(57) ABSTRACT

A user interface is displayed to an administrator (or other user) and allows the administrator to walk through a workflow performed by a user in a given role. Data access steps performed in walking through the workflow are recorded and a set of permissions is identified, based upon the recorded workflow. The set of permissions corresponds to the role.

20 Claims, 33 Drawing Sheets

FIG. 2A

Role dmoExpenseManager

| Properties | Categories | |
|---|---|---|
| Name | | dmoExpenseManager |
| Label | | Expense manager role |
| Description | | |
| Enabled | | Yes |
| PastDataAccess | | Delete |
| CurrentDataAccess | | Delete |
| FutureDataAccess | | Delete |
| ContextString | | |
| CreatedBy | | mbsuser |
| CreationDate | | 8/29/2012 |
| CreationTime | | 01:33 00 pm |
| ChangedBy | | mbsuser |
| ChangedDate | | 8/29/2012 |
| ChangedTime | | 01:33:35 pm |
| Origin | | {E7B960F1-D15B-4C35-B532-9FC |
| Model | | USR Model |

AOT-\Security
- Reports
- Visual Studio Projects
- Report Libraries
- Queries
- Jobs
- Menus
- Menu Items
- Web
- Services
- Service Groups
- Workflow
- Security
  - Code Permissions
  - Privileges
  - Duties
  - Roles
    - dmoExpenseManager(usr)
    - AnonymousApplicant
    - AnonymousCustomer
    - BOMProductDesigner
    - BOMProductDesignManager
    - BudgetBudgetClerk
    - BudgetBudgetManager
    - CollectionLetterCollectionsAgent
    - CollectionLetterCollectiosManager
    - CompanyChiefExecutiveOfficer 121, 123

| Set entry point permissions (1) | | | | | |
|---|---|---|---|---|---|
| File ▼ | | | | | |
| Step 1: Set the access level for each entry point. Click Next when you are done. | | | | | |
| Entry point type | Entry point name | Label | New access level | Current access level | ViewUserLicense \| MaintainUserLicense |
| Menu item display | BudgetTransactionListPage | All budget register entries | No access | No access | Functional Users \| Functional User |

259
261
263

Bulk update
Desired access level for each selected entry point: [No access ▼] [Apply]

Value of ViewUserLicense property

[Next]
[Close]

CREATION OF SECURITY ROLES THROUGH USER WALKTHROUGH OF BUSINESS PROCESS WORKFLOW

The present application is based on and claims the benefit of U.S. provisional patent application Ser. No. 61/701,844, filed Sep. 17, 2012, the content of which is hereby incorporated by reference in its entirety.

BACKGROUND

Many different types of computer programs and computer systems employ a wide variety of different types of security. Some security measures limit the access that different users have to the computer program or computer system, based upon the role that the individual user plays with respect to the computer system. For example, a manager may have different access than a sales representative. In these types of situations, it can be difficult to determine exactly what access individual users (who have individual roles) should have to the computer system.

As one example, there are many different types of business computer applications or computer systems. Some of those different types include enterprise resource planning (ERP) systems, customer resource management (CRM) systems, line-of-business (LOB) applications, or other systems that involve business data. In this example the computer system is an ERP system. In an ERP system, different users of the system are given different levels of access to the information stored in the system. For instance, a user that is employed in a human resources position may have access to the personal files (such as salary information, security clearance information, etc.) for the employees of the company. That same person, however, may have no access to the sales data for the company. On the other hand, a sales manager may have access to a great deal of customer data and sales data in the ERP system, but may not have access to the personal information files for the employees in the company. It can thus be seen that the role that an individual plays in the company can determine what types of access or privileges the user is given to the ERP system. This can be referred to as a system with role-based access.

These types of systems present certain challenges. For example, it can be difficult to determine exactly what permissions or privileges a given user requires for that user to perform the work necessary to carry out his or her position. For instance, if a user is employed as an accounts payable clerk, it can be difficult to identify exactly which types of data that user should have access to in the ERP system and which components of the system the user needs access to in order to perform the workflow required of an accounts payable clerk. Identifying permissions can take many hours, and can be both inefficient and error prone.

These problems can be exacerbated in certain ways as well. When the business needs of a company change, it would commonly require some modifications to existing role definitions or creation of new roles related to a company When a new role is created, someone must normally create new privileges and permissions within the ERP system for an individual employed in that new role or identify which existing privileges and permissions can be reused. This may also mean that previously-existing roles need to have their permissions or privileges changed as well, in order to accommodate the employee in the new role.

In any of these scenarios mentioned above, an administrator or other person assigning privileges or permissions in the system must normally have intricate knowledge of both the computer system and the way each given user performs the business process workflow required of his or her role in the company. In addition, the process is an intensively manual process. These types of problems exist for substantially any systems that use role-based access control.

The discussion above is merely provided for general background information and is not intended to be used as an aid in determining the scope of the claimed subject matter.

SUMMARY

A user interface is displayed to an administrator (or other user) and allows the administrator to walk through a workflow performed by a user in a given role. The steps performed in walking through the workflow are recorded and a set of permissions is identified, based upon the recorded workflow. The set of permissions corresponds to the role.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4A-4B are exemplary user interface displays.

DETAILED DESCRIPTION

Figure 1:
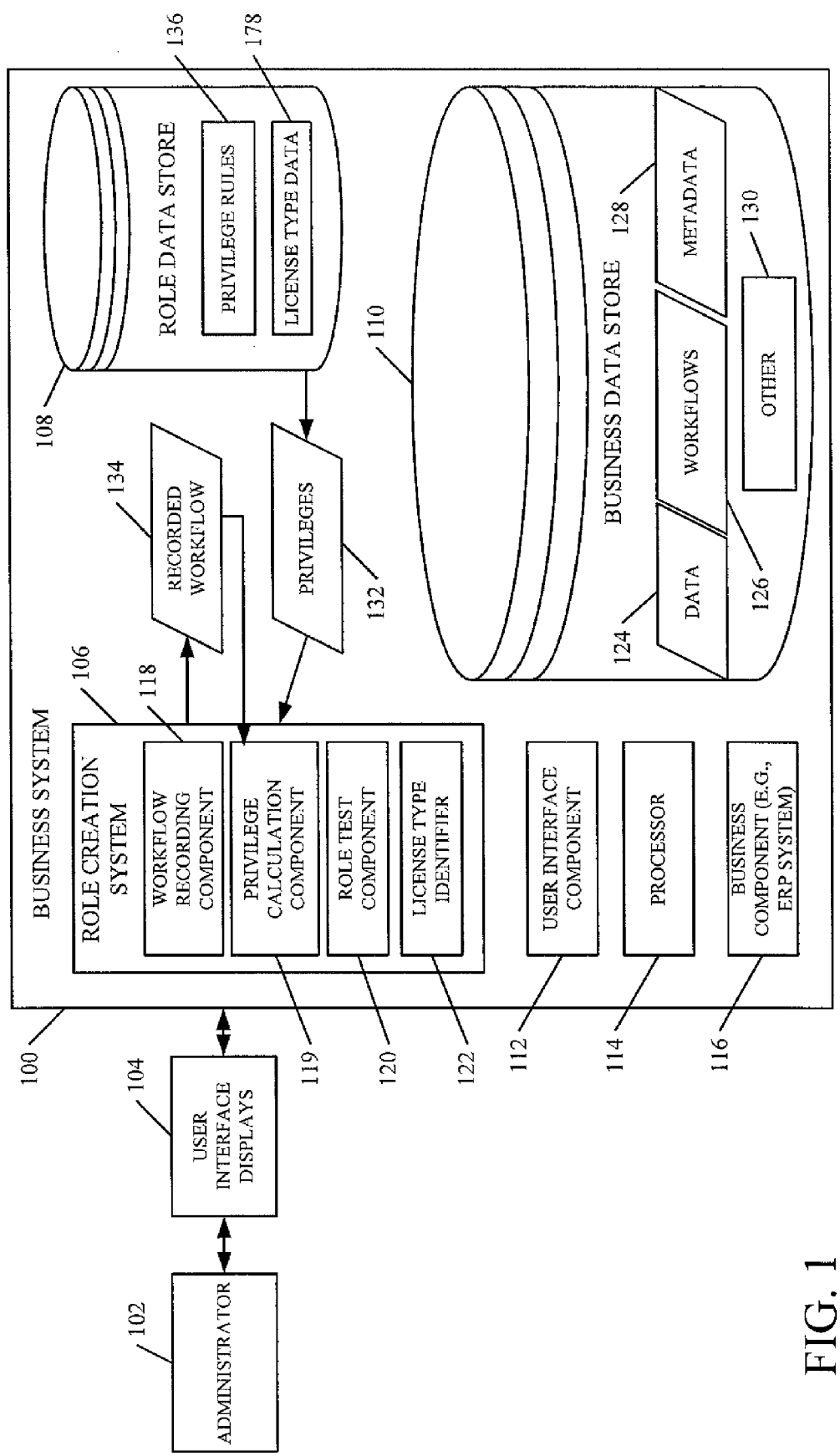
FIG. 1 is a block diagram of one embodiment of a business systems.

FIG. 1 is a block diagram of one embodiment of business system 100. System 100 is shown as being accessible by administrator 102 through one or more user interface displays 104. Administrator 102 can be any user (such as a developer or business analyst, or another person tasked with creating new roles and assigning privileges, etc.) and the term administrator is used for the sake of example only.

System 100 also includes role creation system 106, role data store 108, business data store 110, user interface component 112, processor 114 and business component 116. Role creation system 106, itself, includes workflow recording component 118, privilege calculation component 119, role test component 120 and license type identifier 122.

Processor 114 is illustratively a computer processor with associated memory and timing circuitry (not shown). Processor 114 is illustratively a functional part of system 100 and is activated by, and facilitates the functionality of, other systems and components and items in system 100.

Data stores 108 and 110 can be any of a wide variety of different types of data stores. They are shown as being included in system 100, but they could be located separately from system 100, and accessible by system 100, as well. In addition, data stores 108 and 110 could be combined into a single data store or further divided into additional data stores as well.

Business component 116 is illustratively a business software program or application, such as an ERP system, CRM system, a line-of-business system, or another business software system or program. While business component 116 can be any computer system that uses role-based access control, it is described herein in the context of an ERP system, for the sake of example only. Therefore, business component (ERP system) 116 illustratively accesses business data in business data store 110. The business data 124 can illustratively include data records for the business, such as customer records, sales data, personnel data, invoice and payment data, product data, and a wide variety of other business data. The information stored in store 110 also illustratively includes workflows 126 that are implemented by ERP system 116 for users of business system 100 to perform their jobs. The information further illustratively includes metadata 128 and any other data 130 that can be used by ERP system 116 or other items in business system 100. In one embodiment, ERP system 116 accesses the information in data store 110 in implementing the programs, workflows, or other operations performed by the ERP system 116.

User interface component 112 can be used by other parts of system 100 to generate user interface displays 104 for administrator 102. The user interface displays 104 can have user input mechanisms that receive inputs from user 102 for manipulating the ERP system 116 or for manipulating and interacting with other items in business system 100. In one embodiment, the user input mechanisms can receive user inputs in a wide variety of different ways, such as point and click devices (e.g., a computer mouse or track ball), a keyboard (either virtual or hardware), a keypad, where the display device used to display user interface displays 104 is a touch sensitive display, the inputs can be provided as touch gestures. Similarly, the user inputs can illustratively be provided by voice inputs or other natural user interface input mechanisms as well.

Role creation system 106 can illustratively be used by administrator 102 in order to define the permissions or privileges 132 that are to be assigned to users who are employed in various roles. The operation of role creation system 106 is described in more detail below with respect to the remaining figures. However, an overview of that operation is provided here, for the sake of better understanding.

Administrator 102 first creates a new role in ERP system 116 and launches role creation system 106. System 106 uses user interface component 112 to generate a user interface display 104 through which administrator 102 can provide inputs to create roles and assign those roles to different privileges or permissions. When administrator 102 has specified a role that is to be created, system 106 illustratively generates a user interface display 104 that allows administrator 102 to walk through a workflow that will be performed by a user in the given role. Administrator 102 then walks through that workflow such as by clicking on menu items and other user interface elements in order to perform the workflow that will be performed by the user in the given role. Workflow recording component 118 records the user interactions, as the administrator is walking through the workflow. When the administrator 102 has completed walking through the workflow, workflow recording component 118 provides the recorded workflow 134 to privilege calculation component 119. Role data store 108 illustratively includes privilege rules 136 that assign privileges based on a recorded workflow. The privileges 132 are illustratively the set of permissions or privileges that a user performing the workflow just input by user 108 will require in order to complete the workflow. Privilege calculation component 119 accesses rules 136 to identify the set of privileges 132 needed for the given role, based on the recorded workflow. Role creation system 106 then provides this set of privileges 132 back to the administrator 102 so that administrator 102 can identify the permissions or privileges required for a user in the role that is being created. Administrator 102 can then assign (or confirm assignment of) those privileges to the newly created role for later use by ERP system 116 in implementing role-based access to data in data store 110. Role test component 120 allows the administrator 102 to test the newly created role, and license type identifier 122 allows the administrator 102 to identify a type of license that will be required by a user having the newly created role. All of these items are described in greater detail below.

Figure 2:
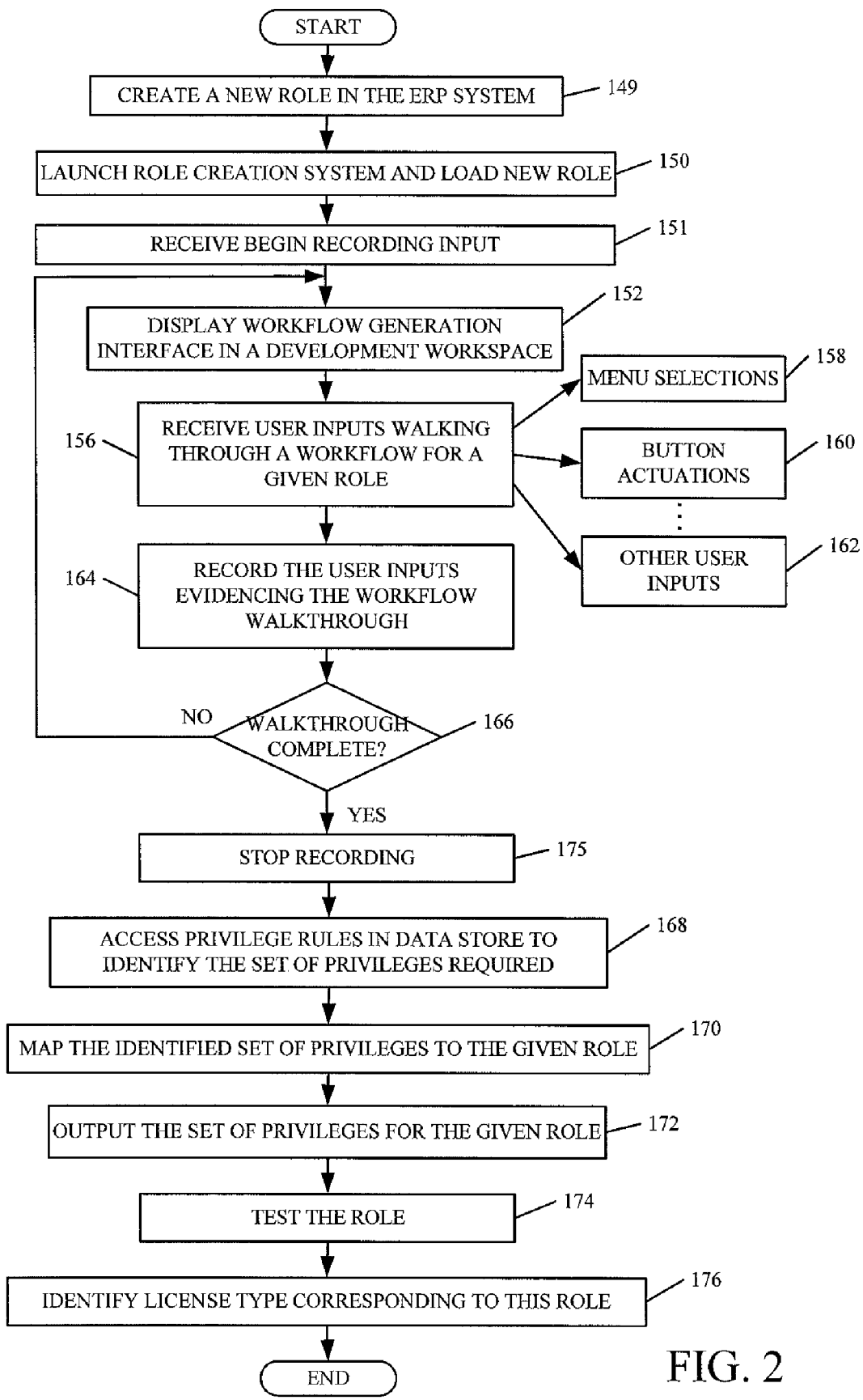
FIG. 2 is a flow diagram illustrating one embodiment of the overall operation of the system shown in FIG. 1 in creating privileges or permissions for a given role.

FIG. 2 is a flow diagram illustrating the overall operation of system 100 in creating a new role and assigning privileges to that role, in accordance with one embodiment. Administrator 102 first launches ERP system 116 and creates a new role in ERP system 116. This is indicated by block 149 in FIG. 2. Administrator 102 then launches role creation system 106 and loads the new role into it. This is indicated by block 150 in FIG. 2, and it can be done in a variety of different ways. For instance, administrator 102 can simply provide inputs through a user interface display 104, or otherwise, which cause processor 114 to launch role creation system 106 and load the new role into it.

FIG. 2A shows one embodiment of a user interface display 121 that is generated by ERP system 116. User interface display 121 allows an administrator 102 to create a new role. In the embodiment shown in FIG. 2A, the new role is a demonstration expense manager role (DMOExpenseManager). In the embodiment shown, a window 123 opens that allows administrator 102 to define certain properties for the newly created role.

Figure 2B:
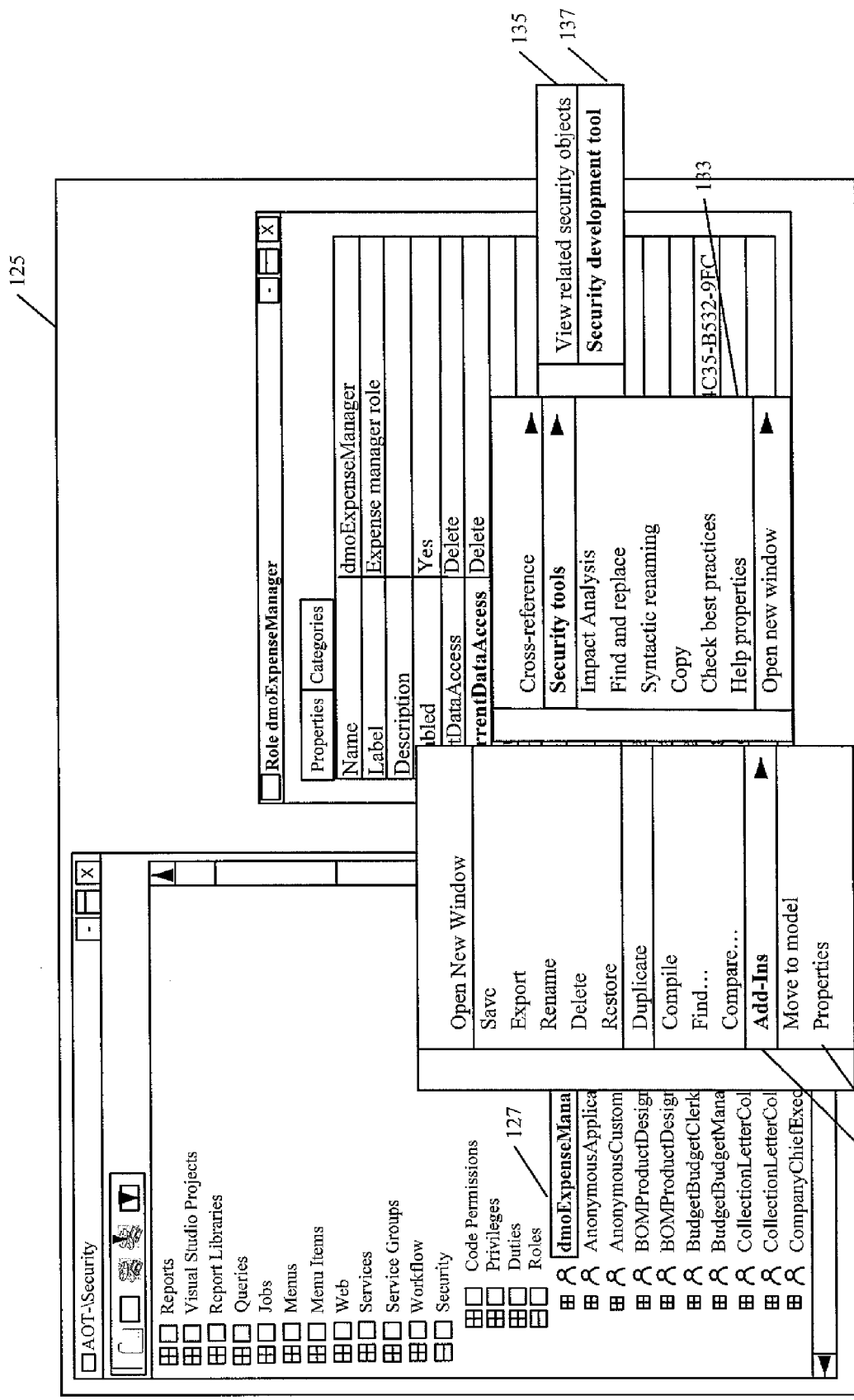
FIG. 2A-2P are exemplary user interface displays.

FIG. 2B shows another user interface display 125 that allows administrator 102 to load the newly created role into role creation system 106, so that privileges corresponding to the newly created role can be identified and assigned. In one embodiment, administrator 102 does this by selecting (such as right clicking) the role identified at 127 which causes pop-up menu 129 to be displayed. The user can then select "Add-ins" 131 which causes pop-up menu 133 to be displayed. By selecting "security tools", pop-up menu 135 is displayed. The user can then select the "security development tool" menu item 137 to launch role creation system 106.

Figure 2C:
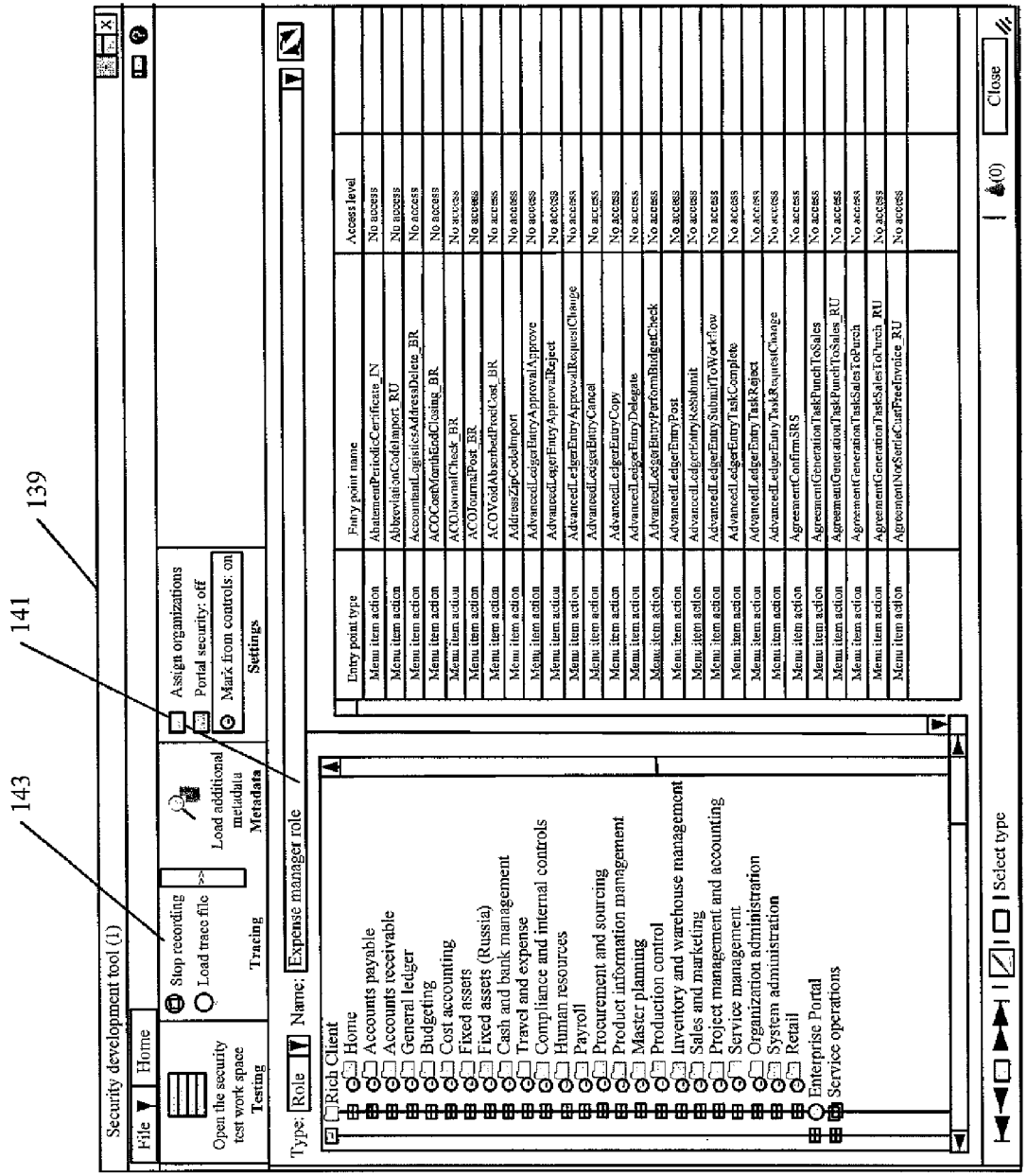

FIG. 2C shows one embodiment of a user interface display 139 that can be generated by role creation system 106, once it is launched. It can be seen that the expense manager role 141 has been loaded into role creation system 106. FIG. 2C also shows that user interface display 139 illustratively includes a "start recording" button 143. When button 143 is actuated, workflow recording component 118 is configured to begin recording user interactions so as to record a workflow. Receiving user actuation of the start recording button 143 is indicated by block 151 in FIG. 2.

Once it is launched and the start recording button is actuated, system 106 uses user interface component 112 to display a workflow generation interface in a development work space. This is indicated by block 152. In one embodiment, the workflow generation interface allows administrator 102 to enter into a development environment, in ERP system 116. That is, system 106 will display a screen that would be displayed by the ERP system 116 to a user having the role being defined by administrator 102.

Figure 2D:
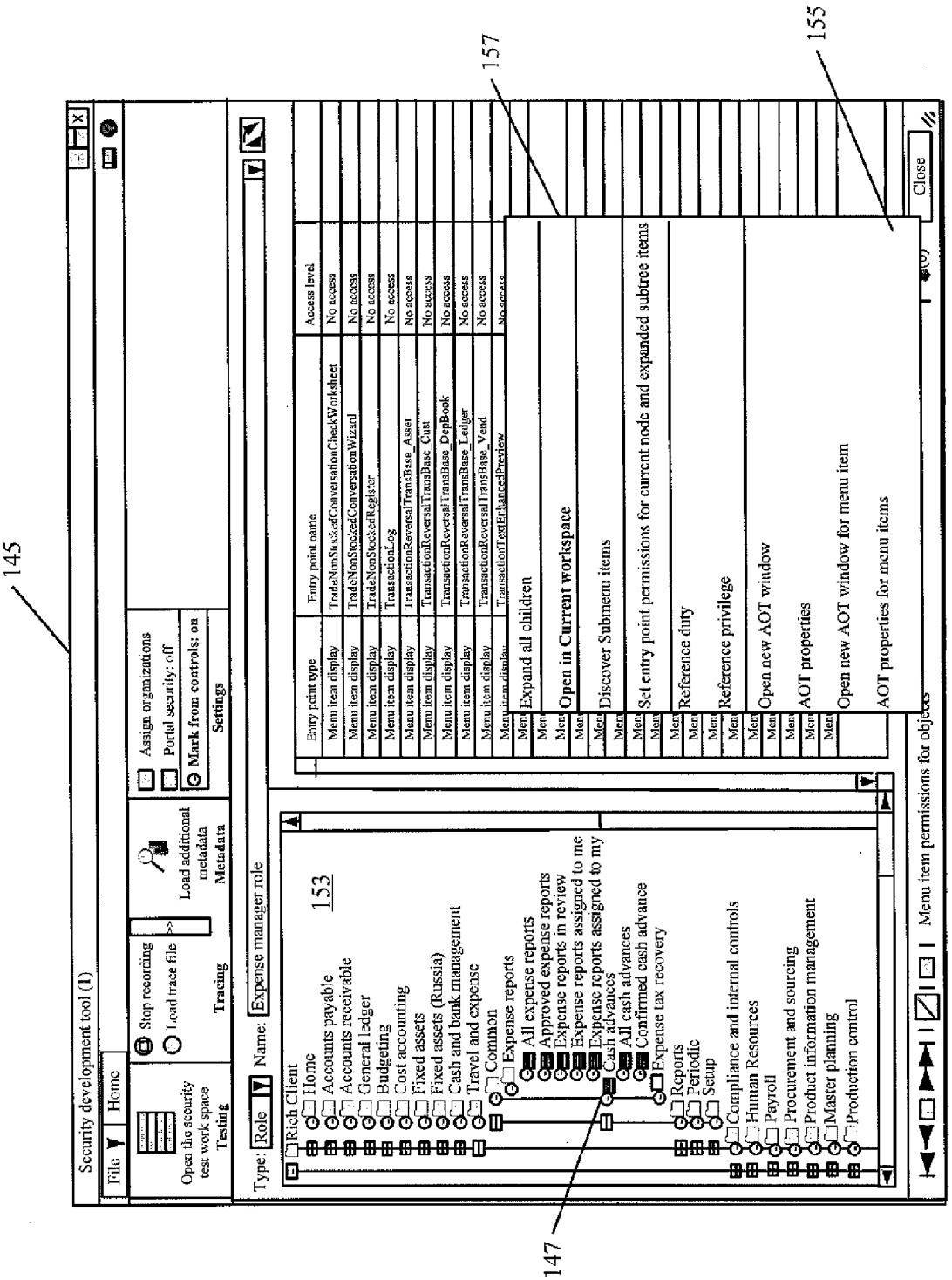
Figure 2E:
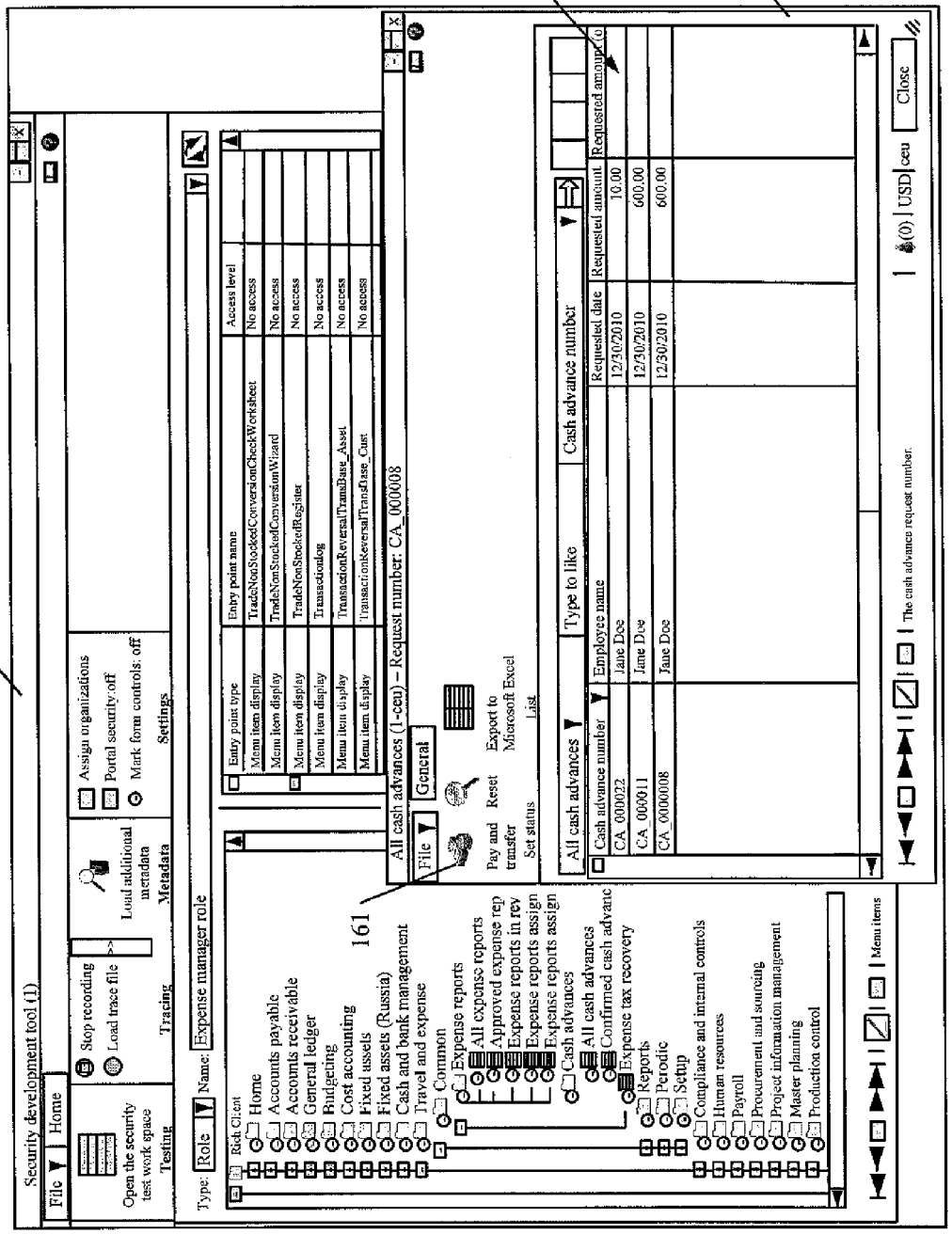
Figure 2F:
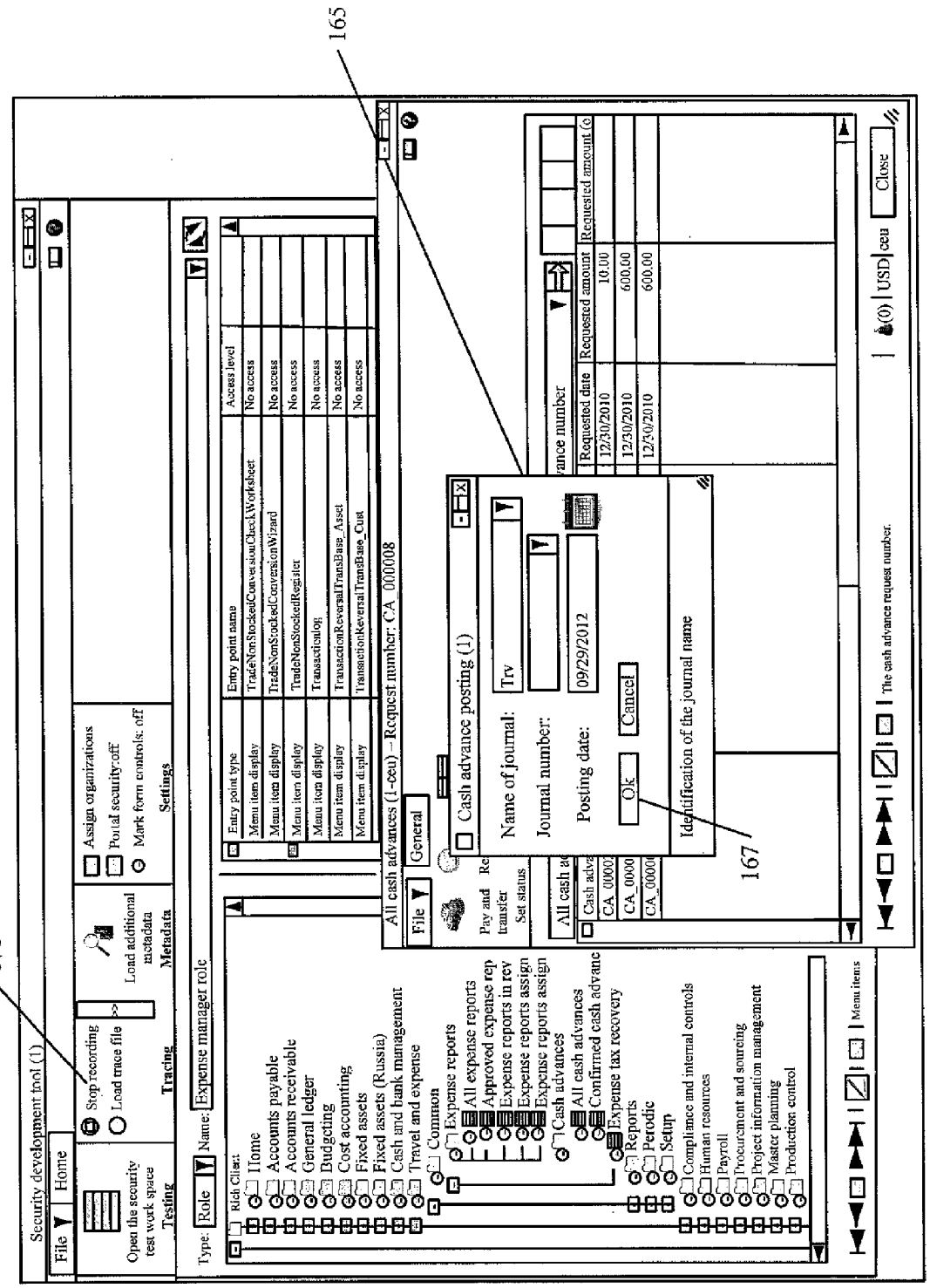

FIGS. 2D-2F show an example of how a workflow is recorded. FIG. 2D shows one embodiment of a user interface display 145 that is generated by role creation system 106 once workflow recording component 118 has been actuated. It can be seen that administrator 102 has selected the workflow (under common travel expense) that will be executed by a user who is performing a cash advance workflow. This is indicated by node 147 in the tree in pane 153. Role creation system 106 generates a pop-up display 155 that allows administrator 102 to indicate that the cash advance workflow is to be opened in a current workspace. This is indicated by menu item 157. When this is actuated, role creation system 106 opens user interface display 159 in a development workspace that allows the user to walk through a workflow for making a cash advance to an employee. In the specific ERP system 116 being illustrated, in order to make a cash advance, a user must select the "pay and transfer" button 161 on display 159 and also make appropriate entries in the columns generally shown at 163. For instance, the user must indicate a cash advance number, an employee name to whom the cash is being advanced, a requested date and a requested amount. This allows the user to provide a cash advance to the designated employee. FIG. 2F shows a further step that is required for the exemplary cash advance workflow, and that is posting the cash advance to the financial ledger. In order to do this, ERP system 116 generates user interface display 165 which allows the user making the cash advance to name the specific journal and journal number that will reflect the cash advance, along with the posting date. The user can then click the ok button 167 to make the entry into the financial ledger, that will reflect the cash advance.

Administrator 102 provides all user inputs through these and other user interface displays 104, to implement or simulate a workflow that will be performed by a user having the given role in making a cash advance. This is indicated by block 156 in FIG. 2. As shown in this example, administrator 102 can make menu selections 158 on the user interface displays. Administrator 102 can perform button actuations of buttons on the user interface displays, and this is indicated by block 160. Of course, the administrator 102 can provide a wide variety of other inputs (such as navigation inputs, actuation inputs, menu selections, button actuations, etc.) and these other user inputs are indicated by block 162 in FIG. 2.

As administrator 102 continues to provide user inputs to walk through the workflow, workflow recording component 118 records the user inputs evidencing the workflow being walked through by administrator 102. This is indicated by block 164 in FIG. 2.

Figure 2G:
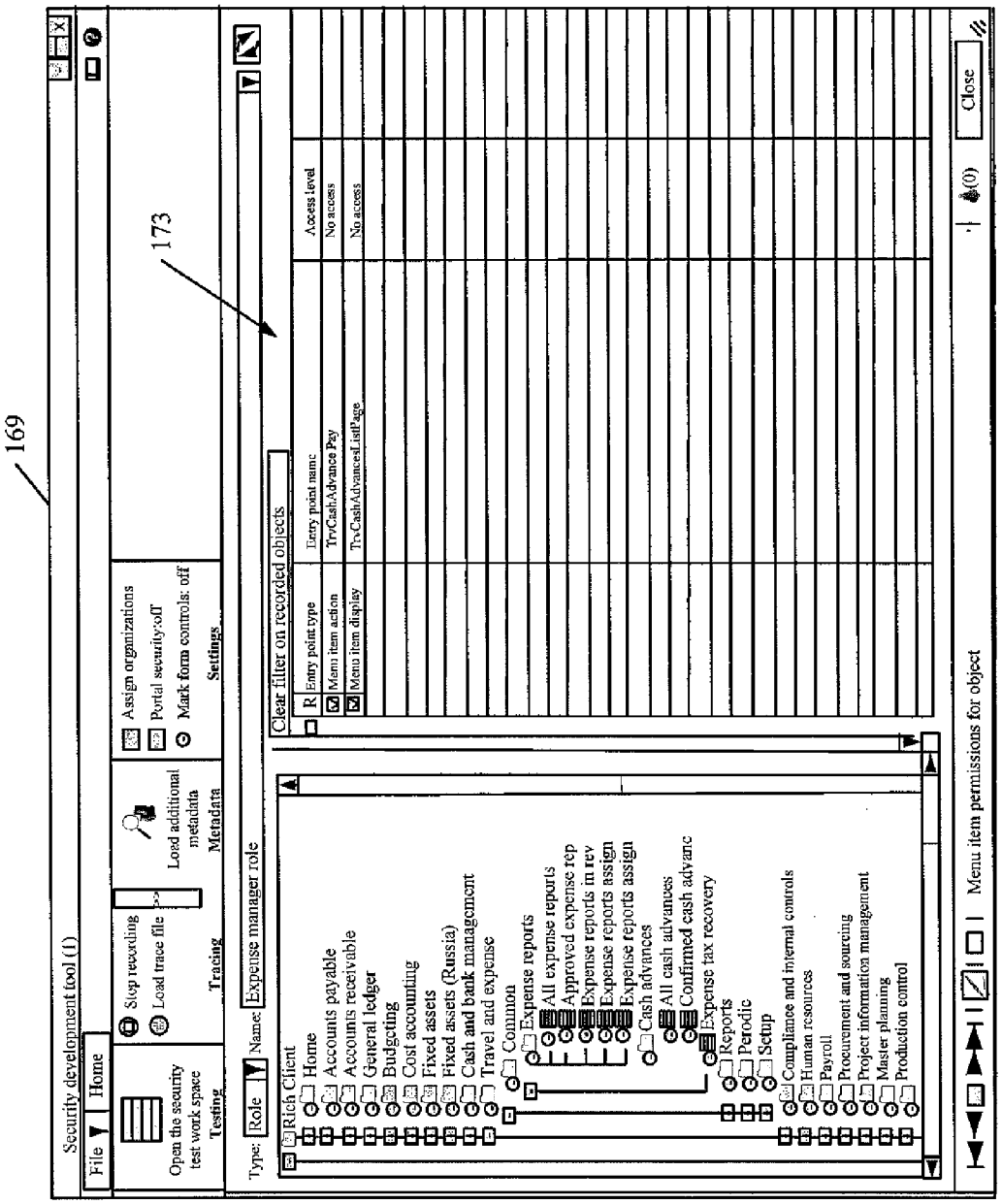

When the administrator 102 is finished performing the walkthrough, administrator 102 illustratively indicates this to system 106. This can be done in a wide variety of ways as well, such as by administrator 102 actuating a "walkthrough complete" user input mechanism, or in other ways as well. FIG. 2G shows a user interface display 169 that is displayed when administrator 102 has clicked the stop recording button 171 shown in FIG. 2F. User interface display 169 also shows that the list of recorded menu items (or user interactions with system 116) have been recorded and they are generally listed at 173. These items listed at 173 indicate the menu items that a user will need access to, within ERP system 116, when the user is performing a cash advance workflow. Determining whether administrator 102 has completed the walkthrough is indicated by block 166 in FIG. 2. Receiving actuation of the stop recording button 171 is indicated by block 175 in FIG. 2.

Figure 2H:
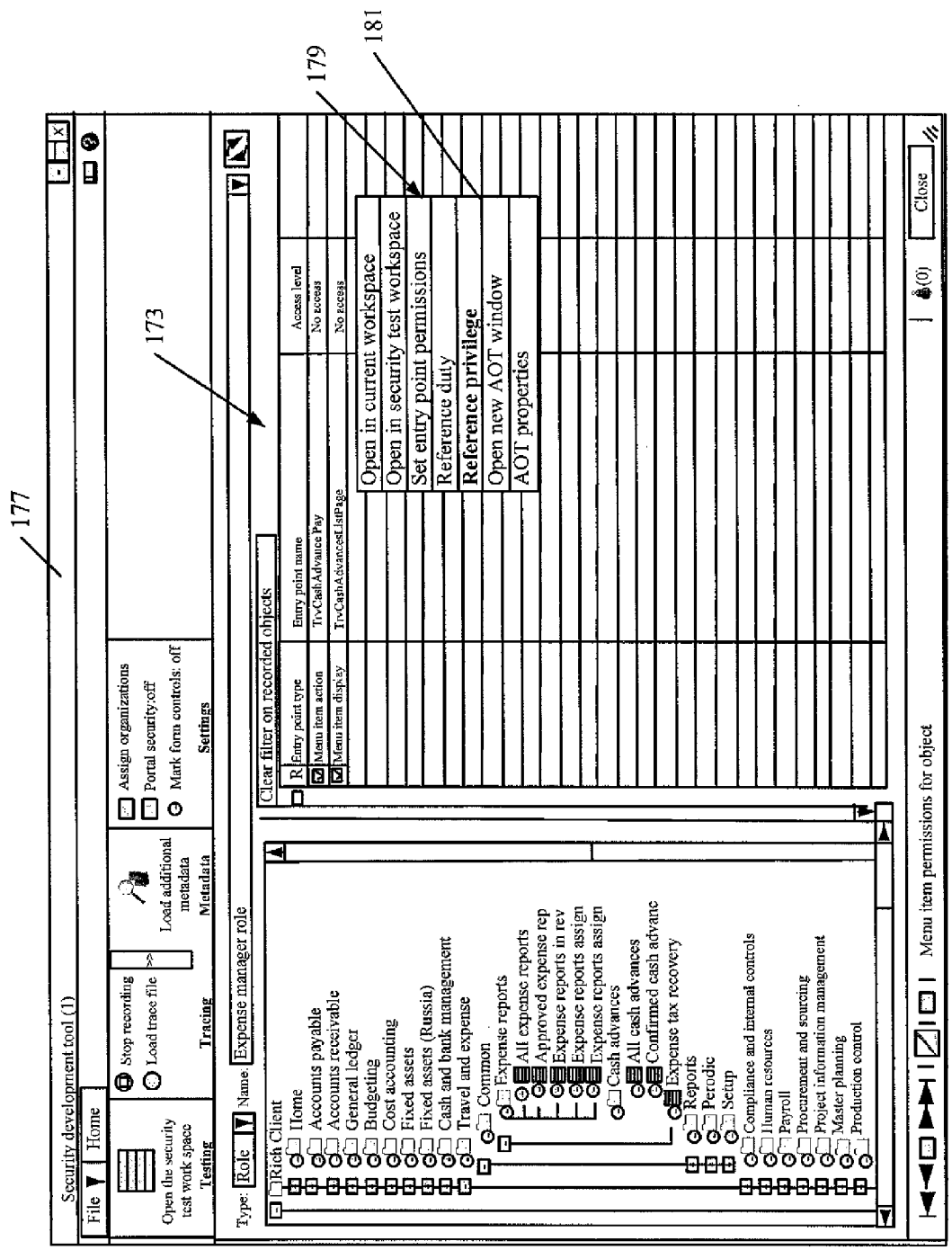

Once workflow recording component 118 has completed recording the workflow, and has displayed the menu items, administrator 102 can identify the specific privileges or duties the user will need to have access to these menu items. Duties are illustratively groupings of privileges. Privileges and duties are collectively referred to herein as privileges. FIG. 2H shows one user interface display 177 for identifying needed privileges. Administrator 102 has selected (such as by right clicking) one of the menu items 173. This brings up menu 179 which allows administrator 102 to reference the privileges that are needed for the user to have access to the selected menu item. When the "reference privileges" item 181 is selected, privilege calculation component 119 accesses privilege rules 136 in data store 108. Privilege rules 136 map different workflow steps (e.g., the business data or menu items accessed during the different workflow steps) to the privileges or permissions in the ERP system 116 that are needed in order to access that data. For instance, where the recorded workflow 134 comprises a set of menu selections made by administrator 102 in performing the workflow, those menu selections will indicate the different types of data that a user in the given role needs to access (e.g., the different entry points into the business data) in order to do their job. Privilege rules 136 map the menu selections to the privileges or permissions in ERP system 116 that are needed in order to make those menu selections. Therefore, using the recorded workflow 134 and the privilege rules 136, privilege calculation component 119 identifies the set of privileges or permissions 132 that are needed for a user in the given role. This is indicated by block 168 in FIG. 2.

Figure 2I:
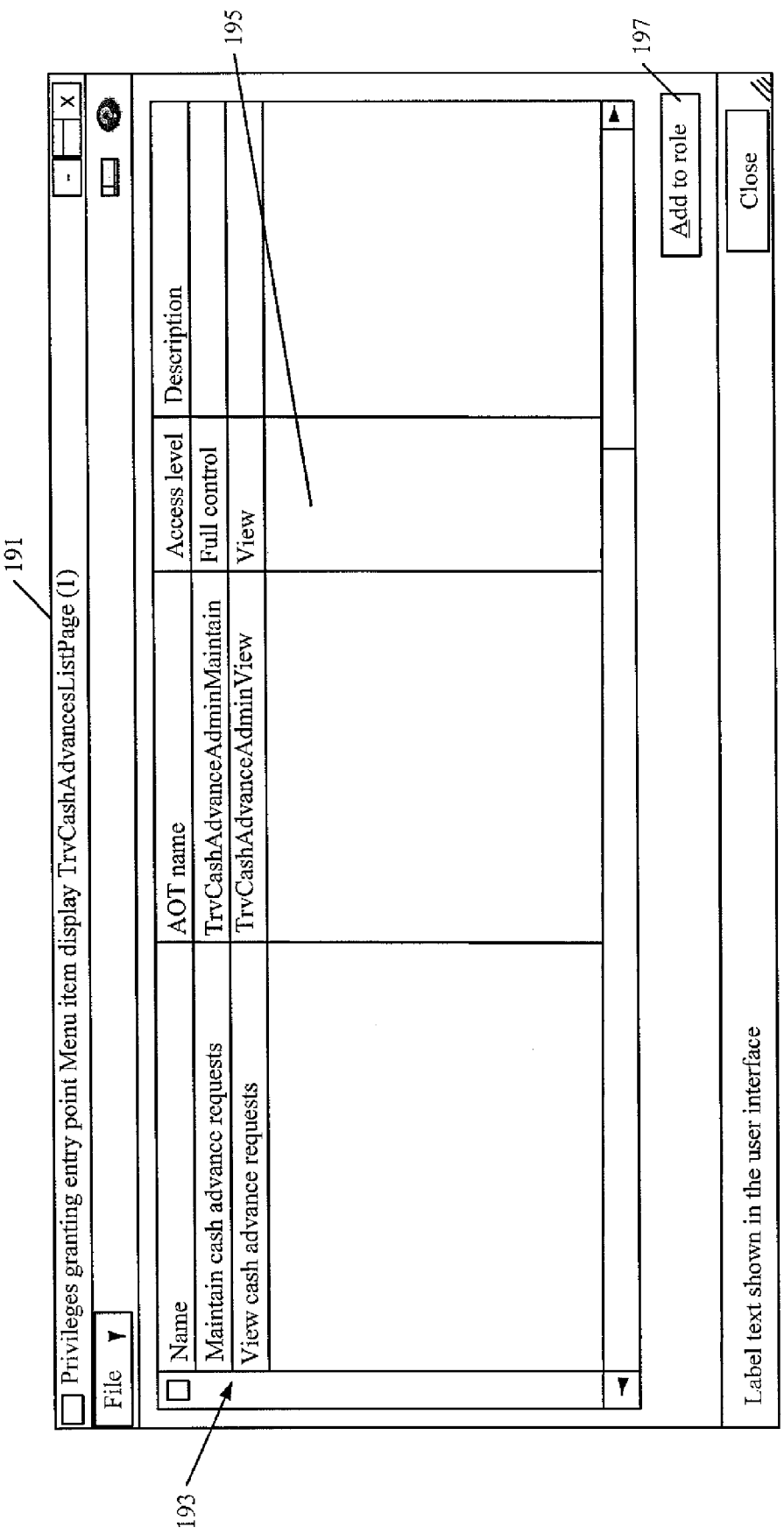

FIG. 2I shows one exemplary user interface display 191 generated by privilege calculation component 119. User interface display 191 shows a set of privileges 193 that are needed to view the menu items 173 shown in FIG. 2H. The administrator 102 can select one of the privileges 193 and the level of access for the privilege is displayed in column 195. Using another user interface display, administrator 102 can create a new privilege and set a different access level, if desired. However, it can be seen in FIG. 2I that administrator 102 has selected the "Maintain cash advance requests" privilege and this privilege grants an access level of "full control", indicating that a user with the given role will have full access to that menu item associated with that privilege. FIG. 2I also shows that "view" access is granted to the "view cash advance requests" privilege associated with the other menu item in display 191. Once the access levels have been identified for each of the privileges 103, administrator 102 illustratively actuates another user input mechanism, such as the "add to role" button 197. This causes role creation system 106 to associate the privilege, and the access level, with the given role in ERP system 116.

Administrator 102 thus maps the identified set of privileges or duties 132 (in FIG. 1) to the given role which is being created and stores that mapping for use by ERP system 116 in performing role-based access. Mapping the identified set of privileges to the given role is indicated by block 170 in FIG. 2. Outputting or storing the set of privileges for the given role is indicated by block 172.

Figure 2J:
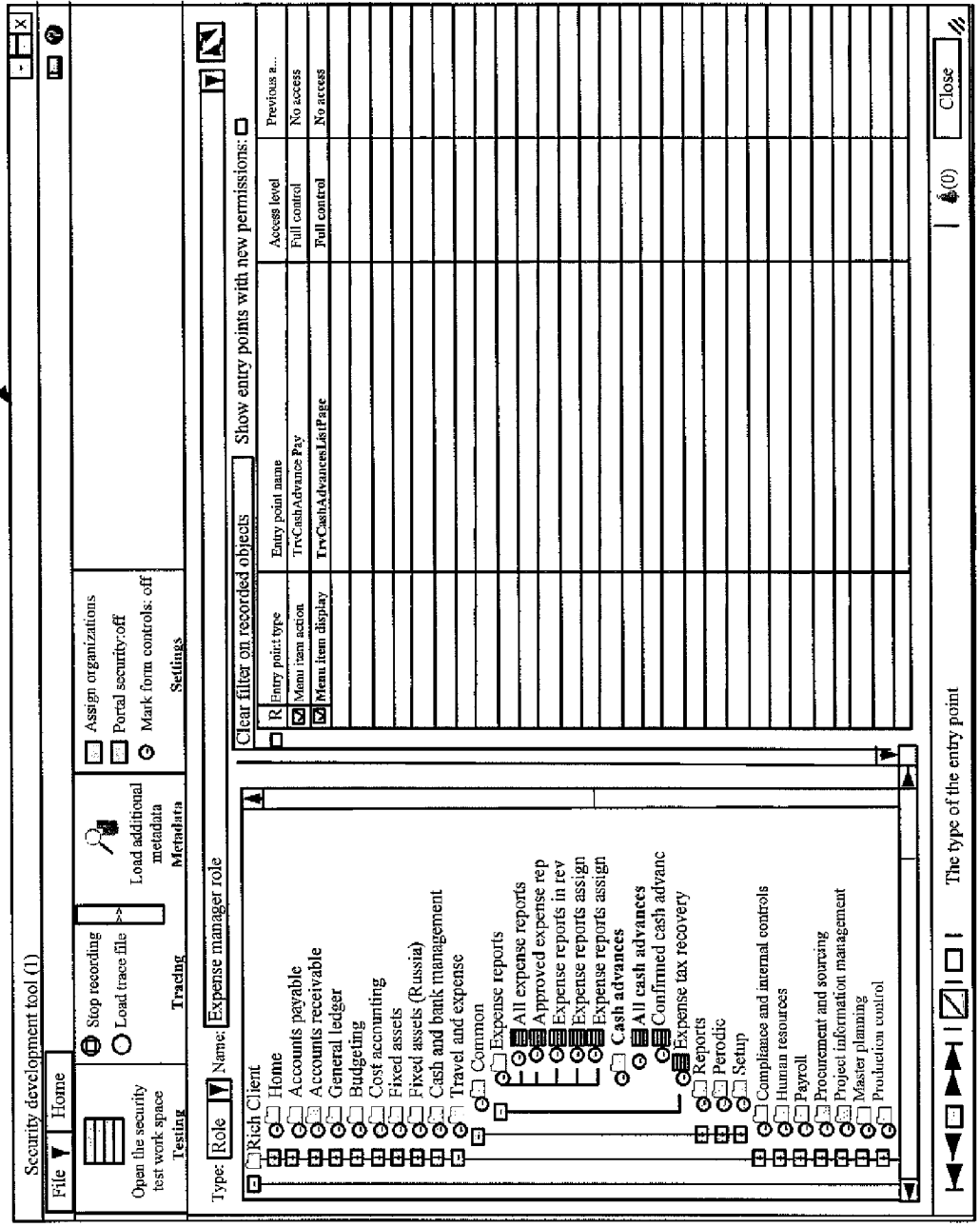

FIG. 2J shows another user interface display 199, that is generated by role creation system 106. User interface display 199 is similar to user interface displays 169 and 173 in FIGS. 2G and 2H, respectively. However, user interface display 199 now shows that the new access level for the menu items listed has been set to "full control". User interface display 199 also shows that the previous access level was "no access" for both menu items. Administrator 102 can thus easily visualize the new menu item permissions from the main menu shown in FIG. 2J.

It will be appreciated that the user interface displays shown above in FIGS. 2A-2J are only one example of user interfaces that can be generated for assigning privileges or permissions to a given role. In one embodiment, these types of user interface displays can be generated in a rich client environment where a client device is deployed with the necessary functionality for performing these tasks.

Other embodiments could be used as well, however. For instance, the role creation system 106 can be deployed in an enterprise system where administrator 102 accesses system 106 through an enterprise portal. In such an embodiment, the user inputs to record a workflow are stored in the enterprise operating system.

Figure 2K:
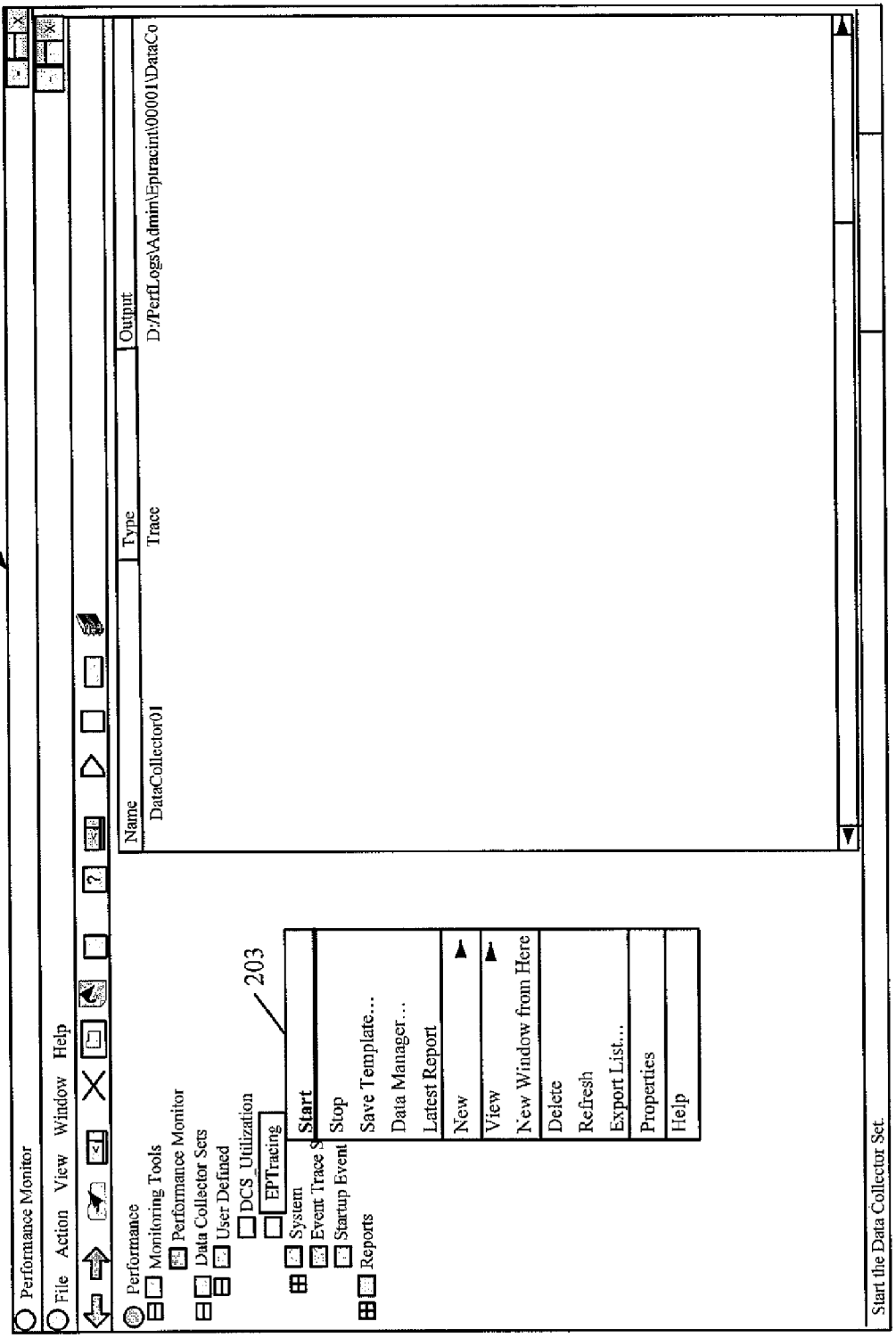
Figure 2L:
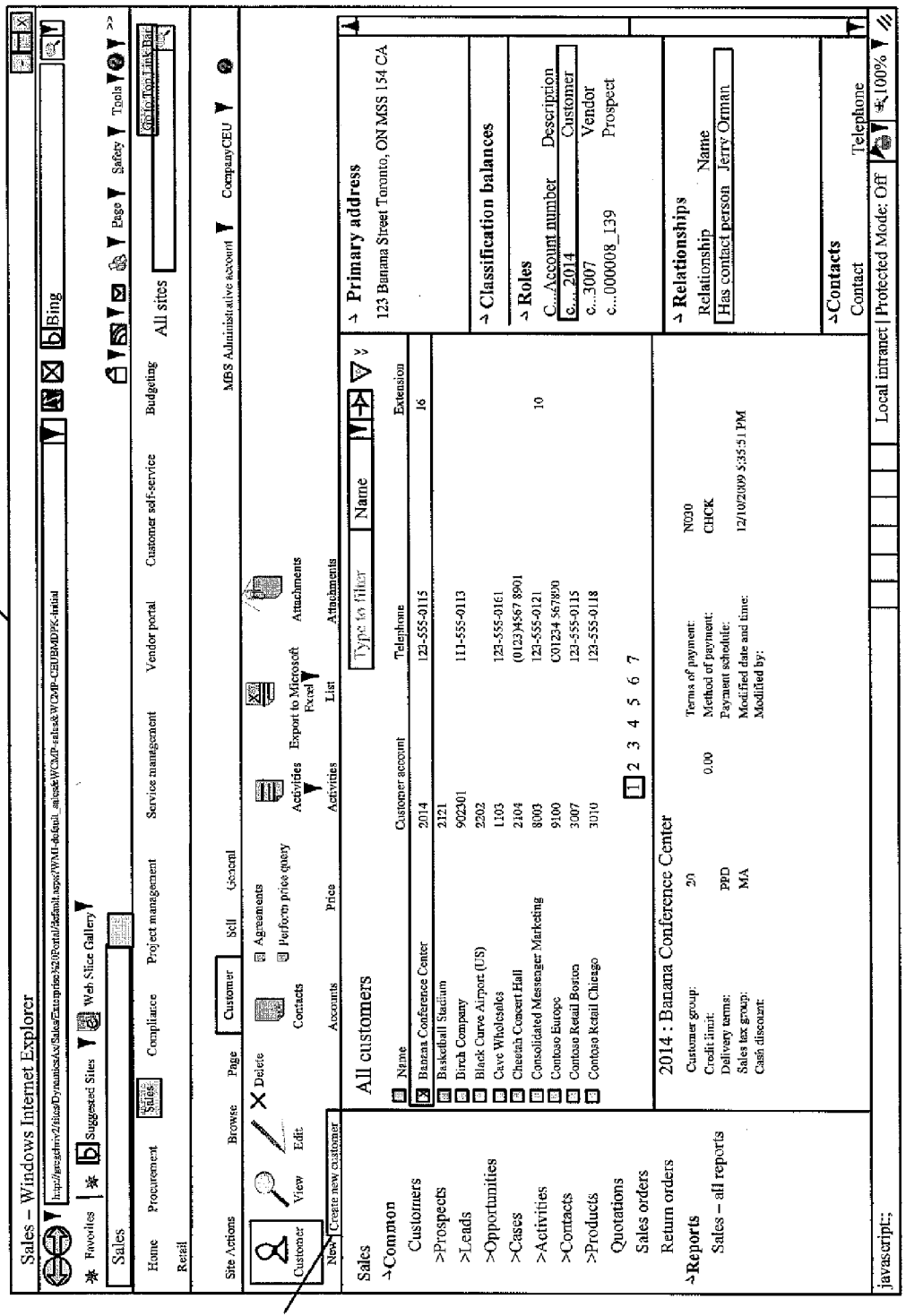
Figure 2M:
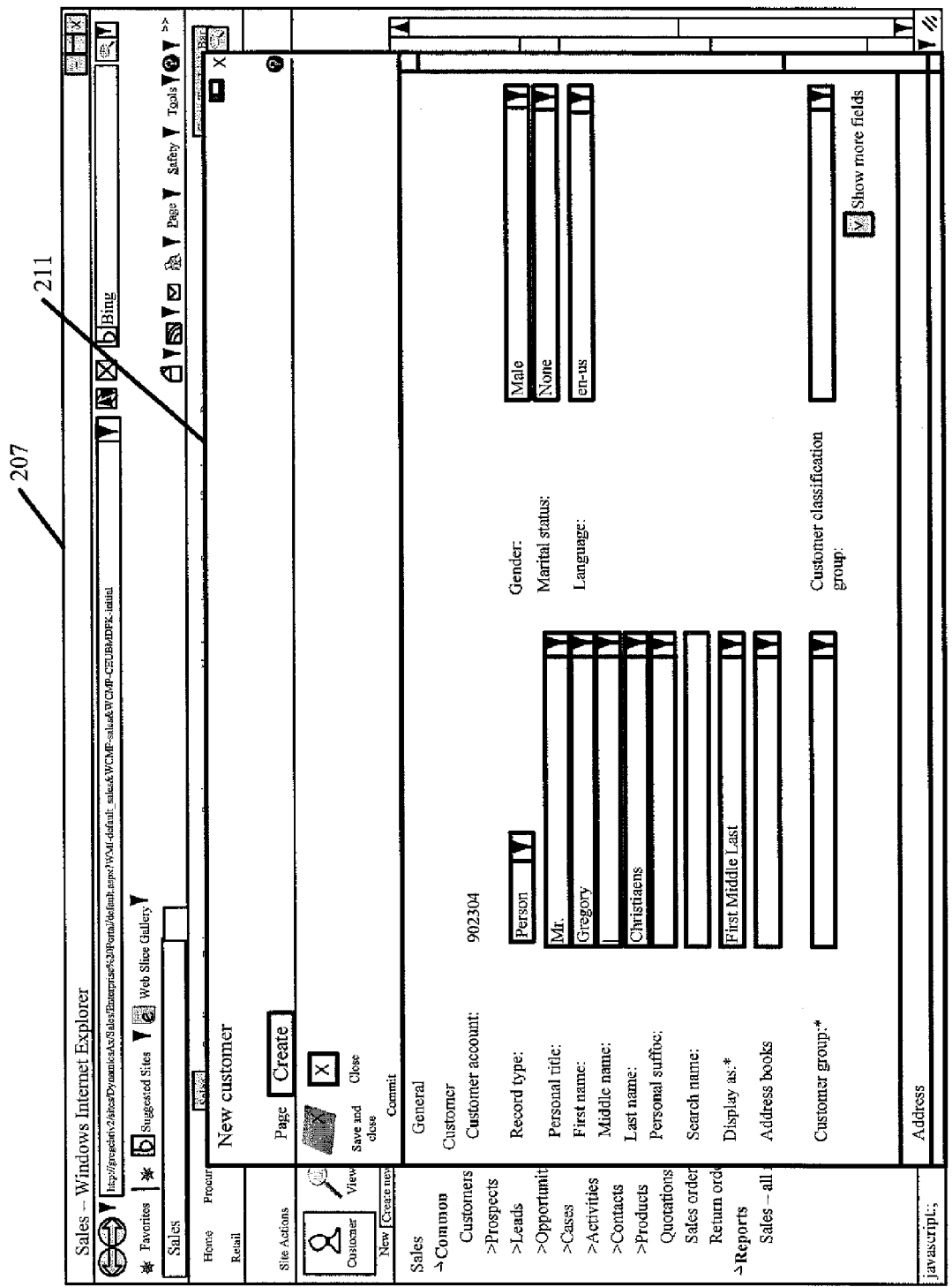
Figure 2N:
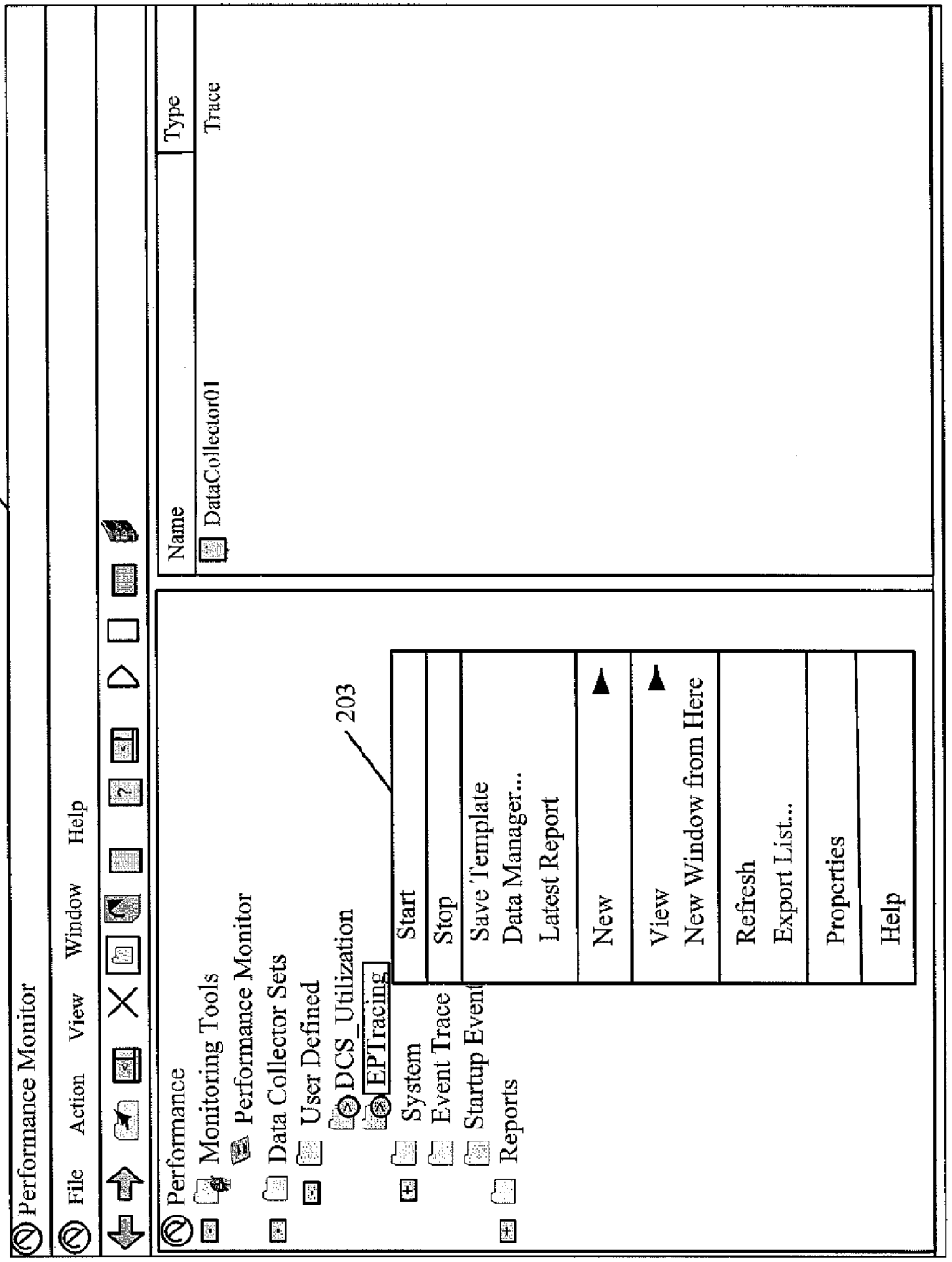
Figure 20:
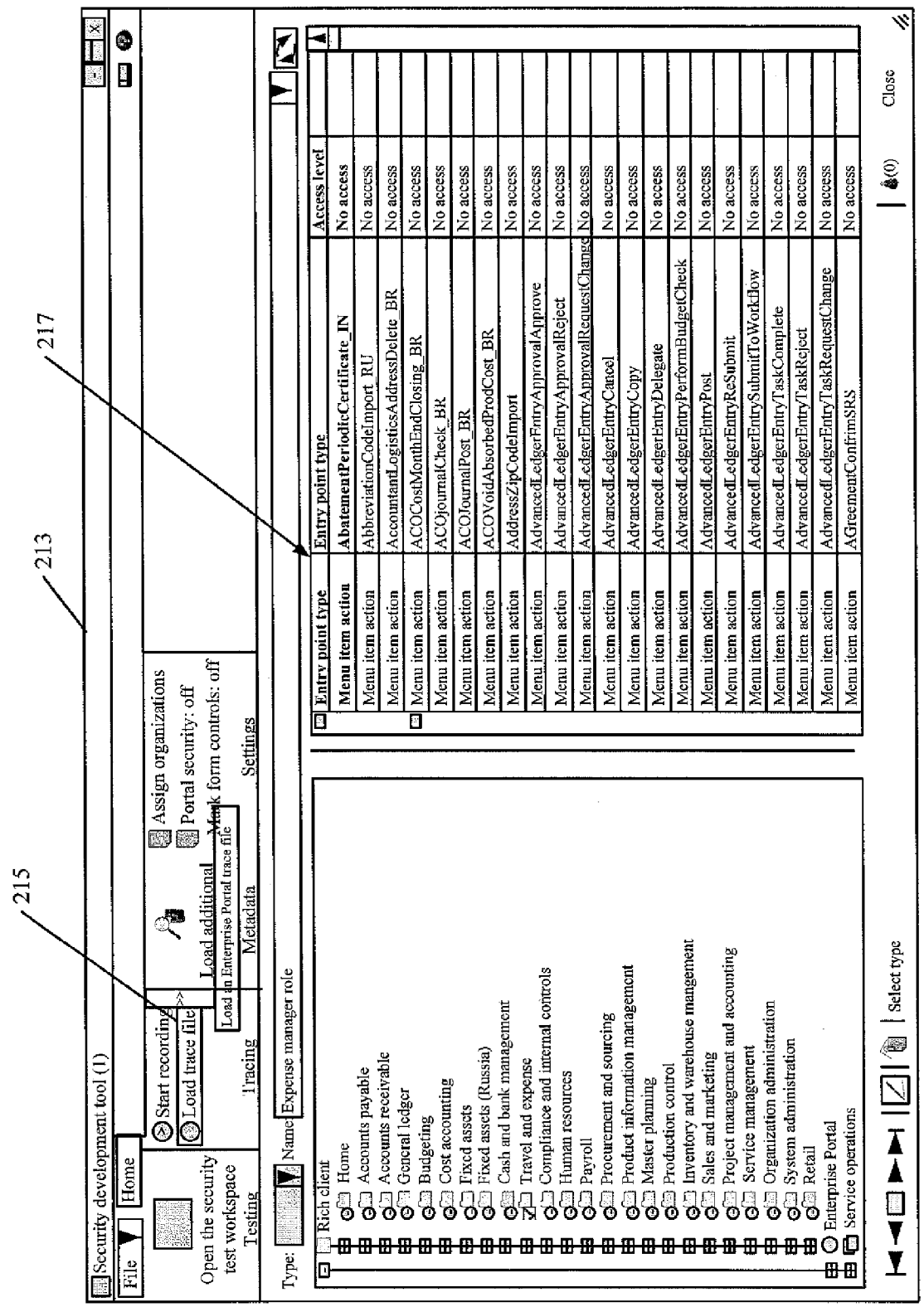

FIG. 2K shows a user interface display 201 that can be generated in such an environment. User interface display 201 allows administrator 102 to launch a performance monitoring tool that enables administrator 102 to register and enable tracing functionality for the enterprise portal. User interface display 201 provides a pop-up menu 203 that allows the administrator 102 to begin the tracing functionality (e.g., launch a data collector to begin recording user inputs of a workflow). FIGS. 2L and 2M illustrate user interface displays 205 and 207, respectively, that are generated in ERP system 116, and allow a user to create a new customer within ERP system 116. In FIG. 2L, administrator 102 can actuate a user input mechanism, such as the "create new customer" button 209. This causes user interface component 112 to generate a new customer display 211 as shown in FIG. 2M. Administrator 102 can provide the necessary information on display 211 to create a new customer record in ERP system 116. Once the business workflow (e.g., for creating a new customer record) has been completed, administrator 102 navigates back to the performance monitor user interface display 201 and selects the "stop" menu item from menu 203. This stops recording and is indicated in FIG. 2N.

Figure 2P:
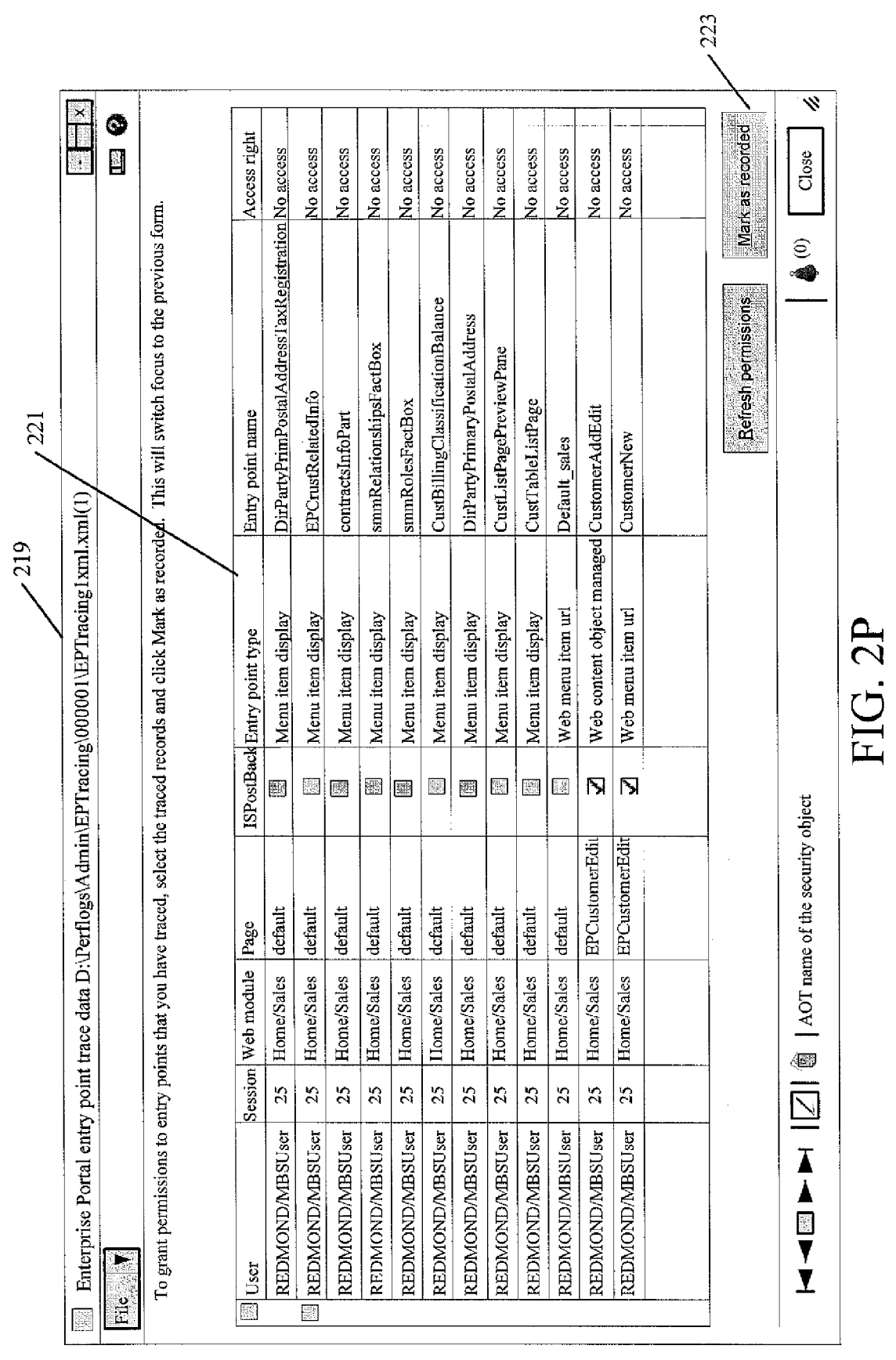

Having recorded the workflow, the administrator 102 can load the recorded workflow into role creation system 106. For instance, FIG. 2O shows a user interface display 213 generated by role creation system 106, once it is launched. By actuating the "load trace file" button 215, administrator 102 can specify a trace file (which has previously been recorded) in order to load an enterprise portal trace file. When the user clicks the load trace file button 215, a list of recorded entry points, which were recorded in the enterprise portal trace file, is displayed for the user. FIG. 2P shows a user interface display 219 that lists a set of recorded entry points 221. Administrator 102 can now select the entry points and click "mark as recorded" button 223. FIG. 2P shows that the user has selected two entry points at the bottom of list 221 that are both related to creating a new customer in ERP system 116. Clicking the mark as recorded button 223 allows administrator 102 to grant permissions (by specifying an access level) for the selected entry points. Again, the user interface displays illustrated in FIGS. 2K-2P are exemplary only, and other user interface displays, or different ones, can be used to record a workflow and assign privileges as well.

Once privileges or duties have been identified or created and assigned to the given role, in one embodiment, role test component 120 then provides a user interface display 104 which gives administrator 102 an opportunity to test the privileges or permissions for the role that has just been created. This is indicated by block 174 in FIG. 2. In one embodiment, role test component 120 allows the administrator 102 to again walk through the workflow in ERP system 116 and ensure that the appropriate user input mechanisms are activated on the various display screens that are displayed during the walkthrough. For instance, where a user has access to a certain menu item or data, a given user input mechanism (such as a button) may be active on a display screen. However, where the user in the given role does not have access to that particular item, then that button may be grayed out or otherwise indicated as being inactive. Role test component 120 illustratively allows administrator 102 to play back the user interface displays to ensure that the appropriate user input mechanisms are active on the appropriate user interface displays. This is described in greater detail below with respect to FIG. 3.

License type identifier 122 then illustratively allows administrator 102 to identify a license type that will be required of a user in the given role. This is indicated by block 176 in FIG. 2. That is, where ERP system 116 is hosted, the host may charge different amounts for various license types. The license types can vary based on how much access a given user requires to the data stored in the hosted system. If a user (such as a sales manager) needs access to a wide variety of customer, vendor, product and sales data, then the sales manager may need a first license type that requires payment of a first license fee. However, if the user only enters invoice data, then the user may only require access to a very limited amount of hosted data, and that may only require a second license type which has a second, smaller license fee. Thus, license type identifier 122 accesses license type data 178 in role data store 108 to determine the type of license needed by a user having the role that was just created. License type identifier 122 provides this to administrator 102. This is discussed in greater detail below with respect to FIG. 4.

Figure 3:
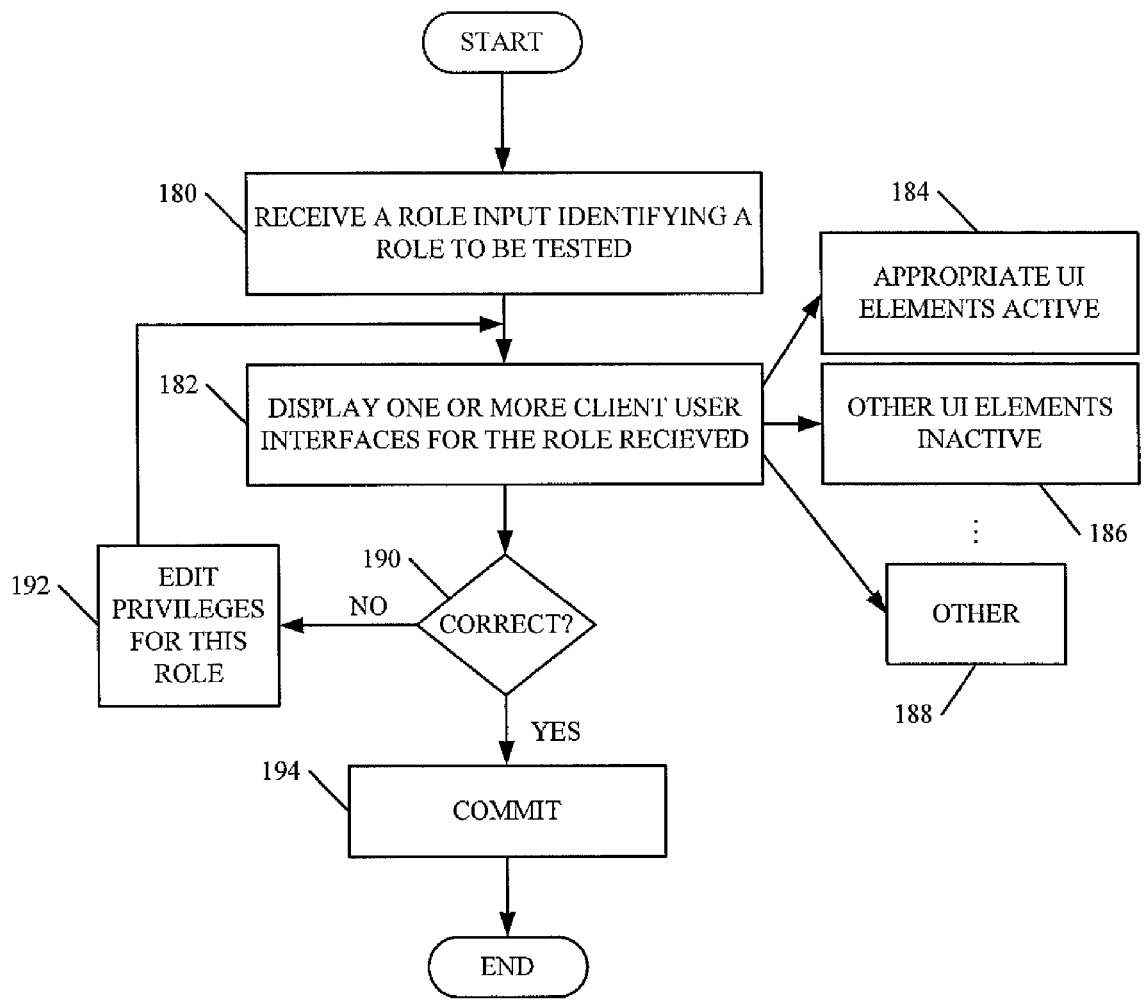
FIG. 3 is a flow diagram illustrating one embodiment of the operation of the system shown in FIG. 1 in testing the privileges assigned during creation of the role.

FIG. 3 is a flow diagram illustrating one embodiment of the operation of role creation system 106 in allowing administrator 102 to test the privileges or permissions assigned to a role, in more detail. It is assumed in FIG. 3 that administrator 102 has already walked through a workflow corresponding to the given role and accessed privilege rules 136 and assigned a set of privileges or permissions to the given role. In one embodiment, this mapping between the given role and the privileges or permissions can be saved by role test component 120, so that it can be tested, before it is actually committed to the ERP system 116. Therefore, administrator 102 illustratively provides a suitable user input through one of user interface displays 104 indicating that administrator 102 wishes to test the privilege assignments to a given role. This causes role test component 120 to generate a user interface display 104 that allows administrator 102 to input the role to be tested. Receiving a role input identifying a role to be tested is indicated by block 180 in FIG. 3.

Figure 3A:
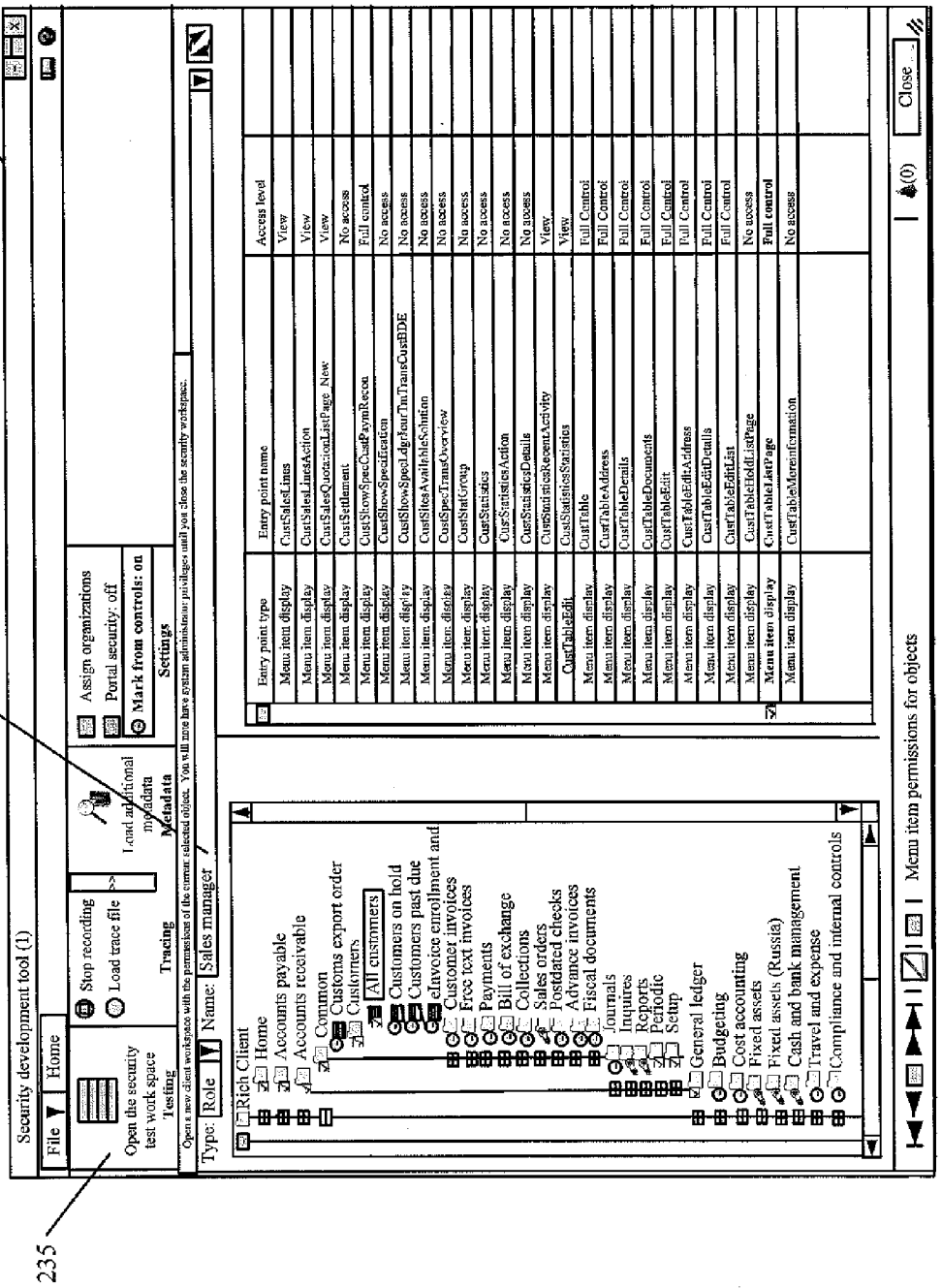
FIGS. 3A-3D are exemplary user interface displays.
Figure 3B:
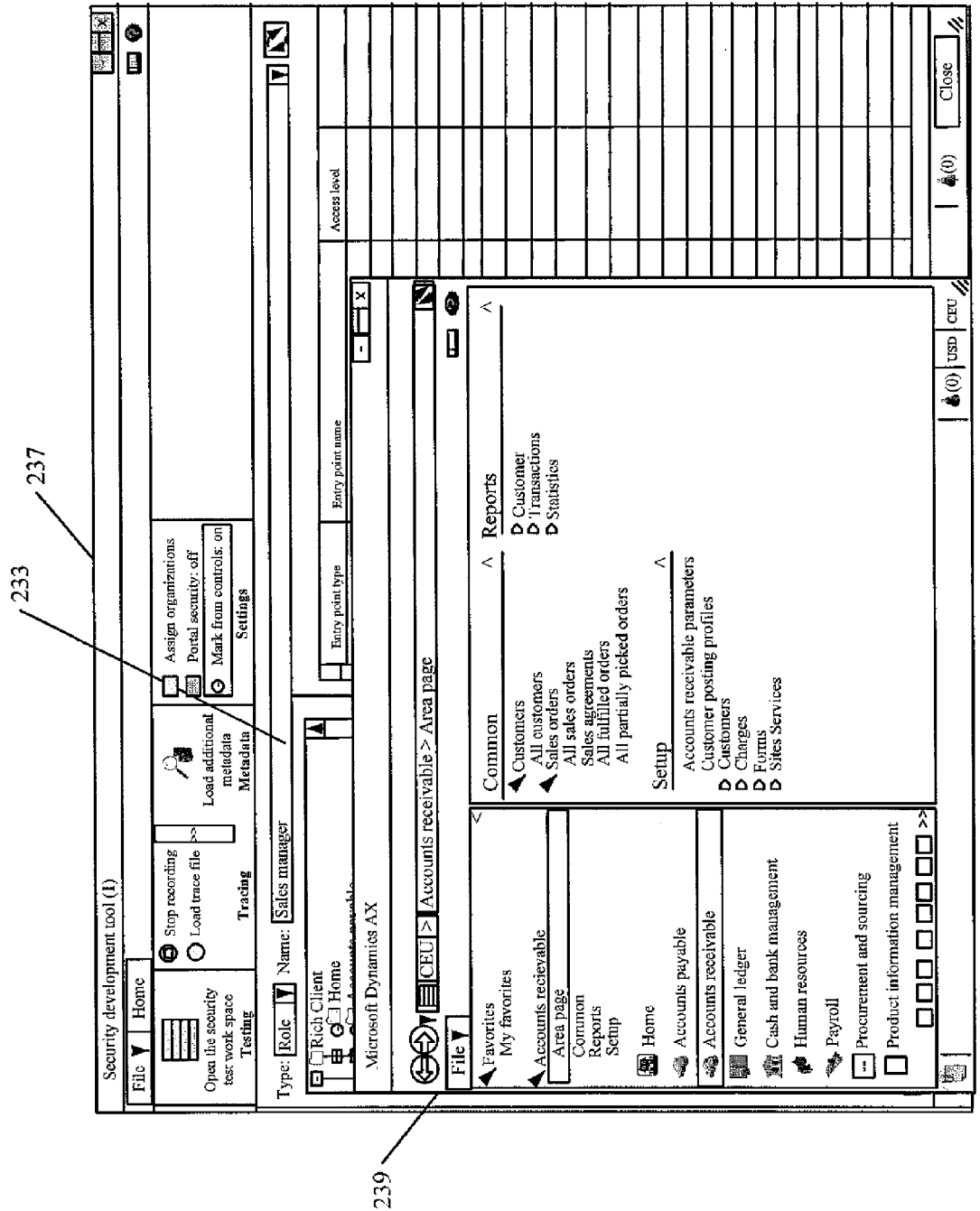

Role test component 120 then generates user interface displays that will be generated by ERP system 116 for the given role, and allows administrator 102 to view the various user interface displays that the user with the given role will see. FIG. 3A shows one exemplary user interface display 231 that allows administrator 102 to open a test work space for testing the assignment of privileges to a given role. In one embodiment, administrator 102 enters the role in text box 233 and then clicks the "open the security test work space" button 235. This causes role test component 120 to open a test work space that is restricted to the permissions for the specified role entered in box 233. FIG. 3B shows one embodiment of a user interface display 237 that illustrates this. In FIG. 3B, role test component 120 has opened a test work space display 239 that has user input mechanisms (such as buttons, menu items, etc.) that are activated or deactivated based upon the set of privileges or permissions that has been assigned to the "sales manger" role. It can be seen that display 239 is displaying the accounts receivable area page and it has user input mechanisms, such as buttons, dropdown menus, etc., that are active or inactive based on the permissions and privileges previously assigned by administrator 102 to the "sales manager" role.

Administrator 102 can then verify that the various user interface displays have the appropriate user input mechanisms activated or deactivated. Displaying one or more client interfaces for the role received is indicated by block 182 in FIG. 3. Displaying them with the appropriate user interface elements active or inactive is indicated by blocks 184 and 186, respectively.

Figure 3C:
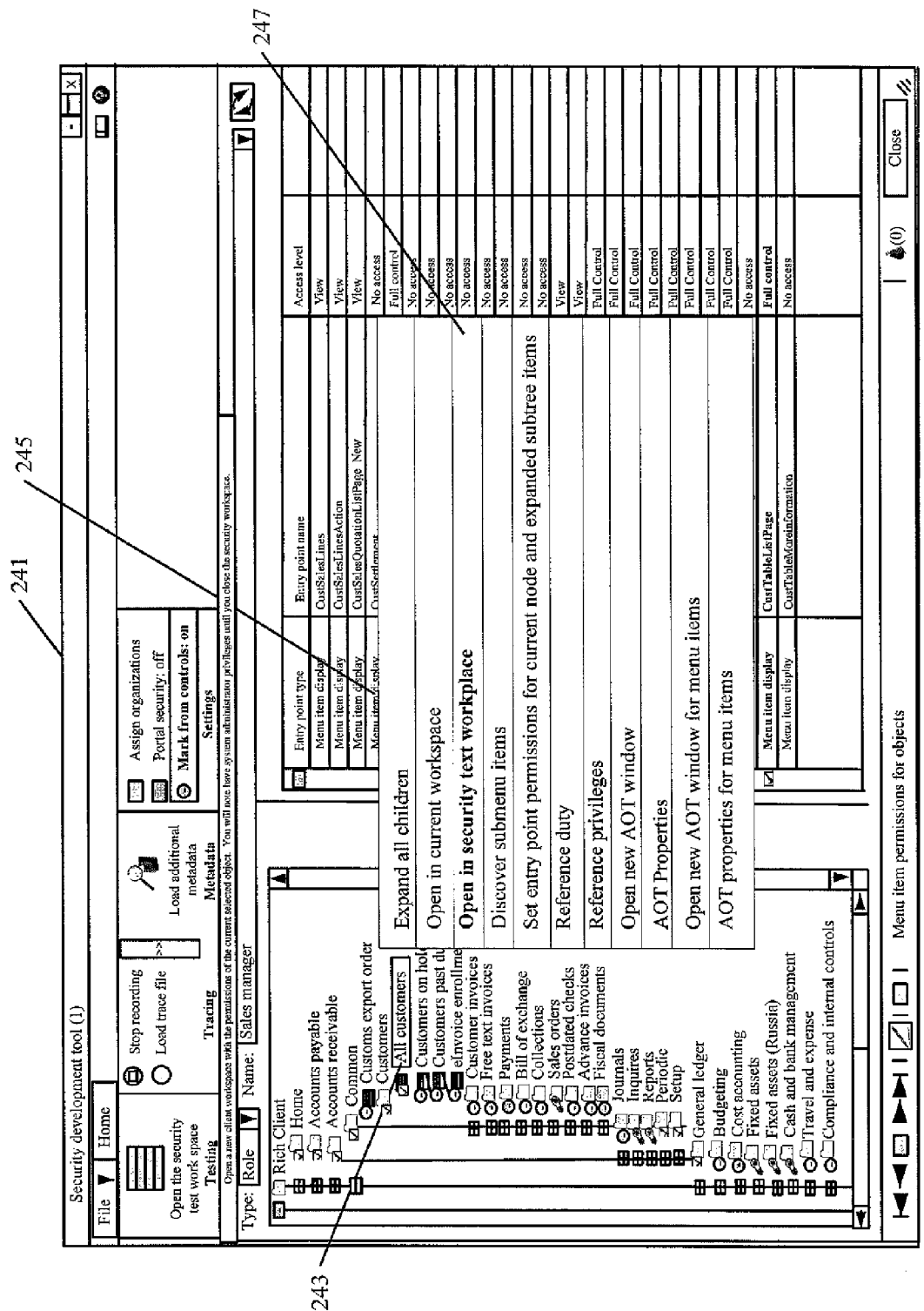
Figure 3D:
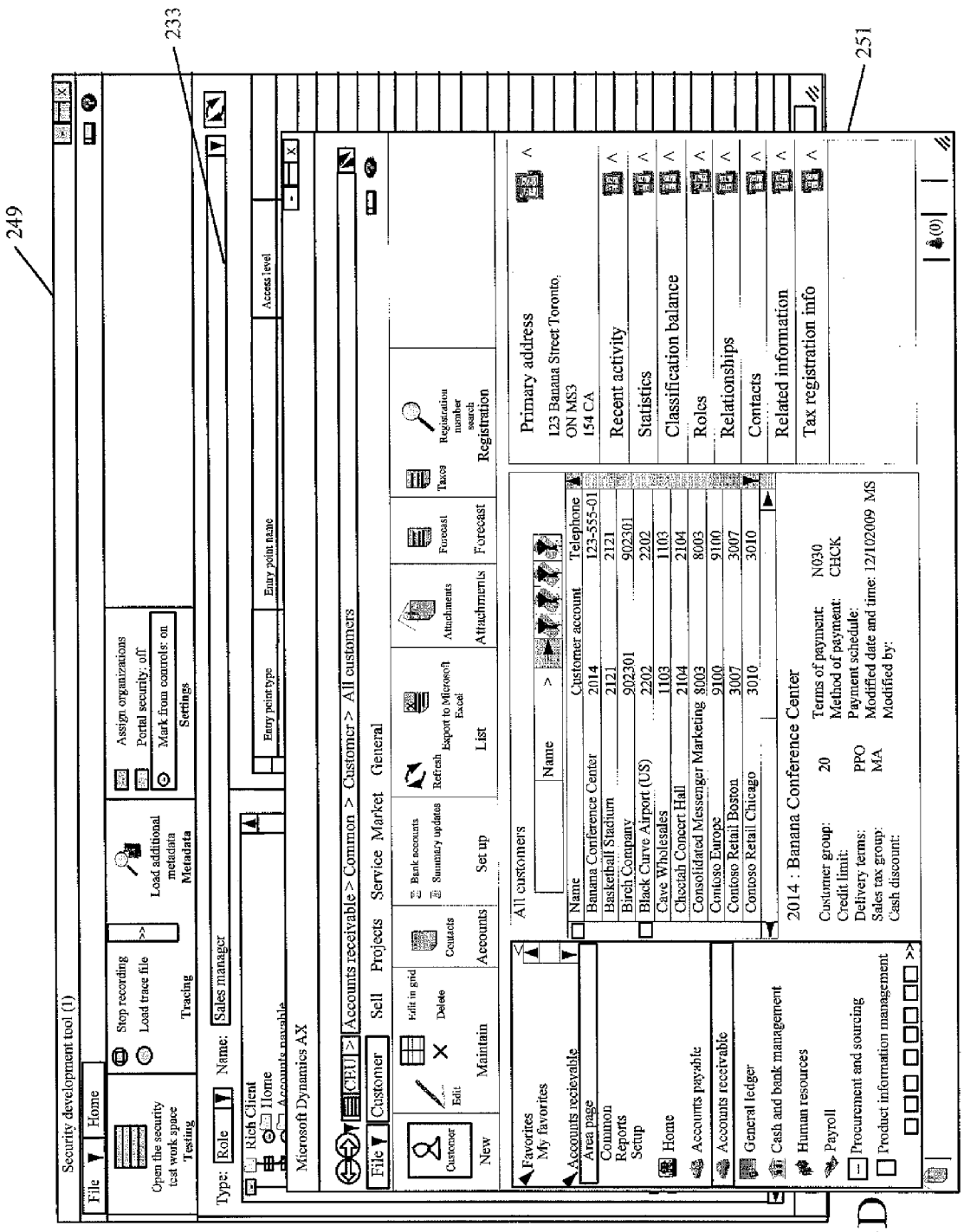

Of course, the user interface displays shown in FIGS. 3A and 3B are illustrative only. Administrator 102 can optionally open a test work space to test assigned privileges in other ways as well. For instance, FIG. 3C shows a user interface display 241 which is generated when administrator 102 right clicks on the "all customers" button 243. This causes menu 245 to be displayed. In one embodiment, administrator 102 can select the "open in security test work space" menu item 247 from menu 245. This causes role test component 120 to open a test work space and generate user interface displays that will be shown by ERP system 116, for the selected role "sales manager" when the sales manager is viewing the "all customers" menu item. FIG. 3D shows one embodiment of a user interface display 249 where the user has done this. It can be seen that role test component 120 generates user interface display 251 that shows the "all customers" menu item with various buttons active or inactive based on the privileges or permissions assigned to the "sales manager" role which has been specified in text box 233. Displaying the user interface displays in other ways so that administrator 102 can test the privileges or permissions assigned to the role is indicated by block 188 in FIG. 3.

Administrator 102 is then illustratively provided with a user interface display that allows administrator 102 to indicate whether the role and the corresponding privileges or permissions are correct or incorrect. This is indicated by block 190 in FIG. 3. If they are incorrect, then role test component 120 allows administrator 102 to again activate workflow recording component 118, and privilege calculation component 119, or to otherwise provide editing inputs to edit the privileges or permissions for the given role. This is indicated by block 192 in FIG. 3. Processing then reverts to block 182.

If, however, at block 190, the administrator 102 confirms that the role and corresponding privileges or permissions are correct, then role creation system 106 provides a suitable user interface display 104 that allows administrator 102 to commit the role and the corresponding privileges or permissions to ERP system 116. This is indicated by block 194 in FIG. 3. At that point, administrator 102 has successfully created a new role and also assigned it a set or bundle of privileges or permissions that allow ERP system 116 to perform role-based access or other role-based security, given the newly created role.

Figure 4:
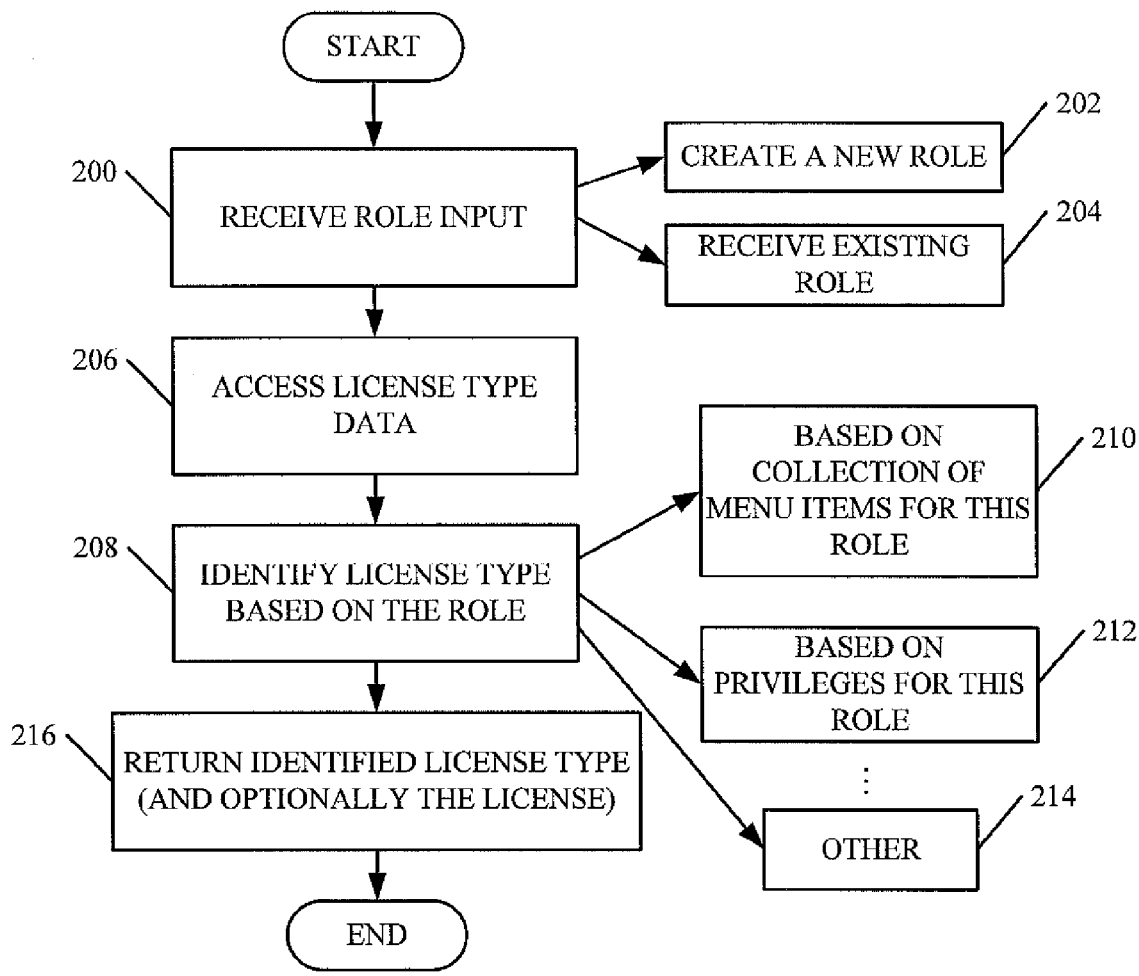
FIG. 4 is a flow diagram illustrating one embodiment of the operation of the system shown in FIG. 1 in identifying a license type for a newly created role.
Figure 4A:
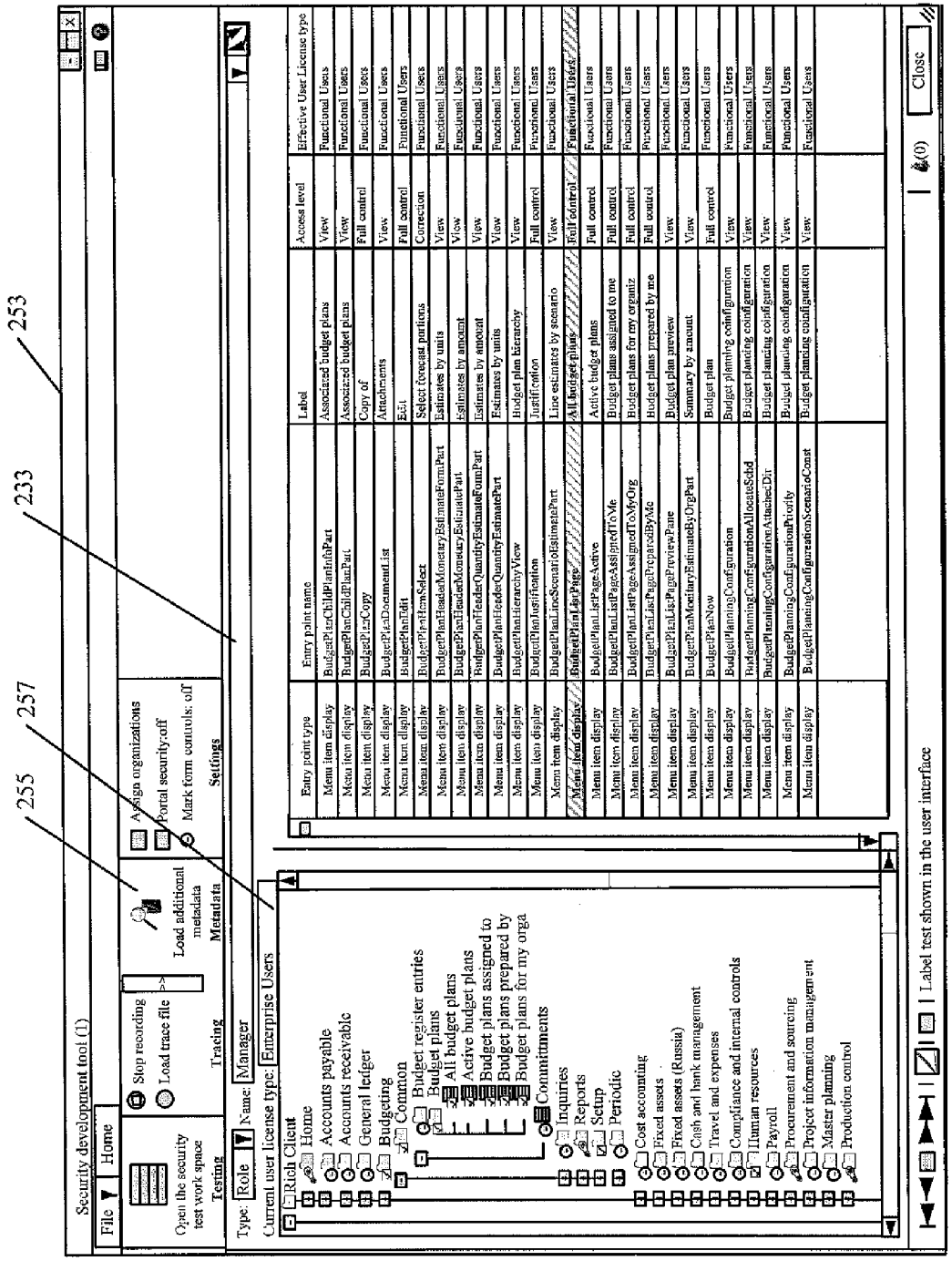

FIG. 4 is a flow diagram illustrating one embodiment of the operation of license type identifier 122 in identifying a type of license that a user with the given role will need to use ERP system 116, and to display that to administrator 102. In one embodiment, administrator 102 accesses a suitable user input mechanism to either identify a role that has already been created, or to identify the new role that has just been created. In either case, administrator 102 illustratively identifies a role for license type identifier 122. Receiving a role input is indicated by block 200 in FIG. 4. Specifically receiving the role input by creating a new role is indicated by block 202, and receiving an identifier for an existing role is indicated by block 204. FIG. 4A shows one user interface display 253 where the administrator 102 has specified the role as "Manager" in text box 233. Administrator 102 can request license type identifier 122 to identify the license type needed for the Manager role by actuating a user input mechanism, such as the "load additional metadata" button 255.

License type identifier 122 then illustratively accesses license type data 178 in data store 108. As briefly discussed above, license type data 178 illustratively maps various permissions or privileges to the different types of licenses that are needed to use ERP system 116. In one embodiment, different types of licenses are based on the different amounts of data that a user in a given role will need to access or based on the type of access granted (such as view only, or edit, etc). A user that has a role that accesses a small portion of data (or has only view access to data) may have a first type of license with a relatively small license fee. However, a user that has a role that accesses a great deal of data (or that has edit access to the data), may have a different type of license that requires payment of a larger license fee. It may also be that the license type data 178 indicates that users that need access to more sensitive data are required to pay a higher license fee than users that have access to less sensitive data. For instance, a human resources person may have access to sensitive personal or confidential information of employees of a company. It may be that this type of access requires a higher license fee than a user that simply needs to input invoice data. Of course, other ways of delineating between the various license types and the corresponding license fees can be used as well. License type data 178 simply provides a way of mapping between the set of permissions or privileges corresponding to a given role and the type of license that is needed for a user that has that role. Accessing license type data 178 is indicated by block 206 in FIG. 4. Identifying the license type based on the role input is indicated by block 208. Again, this can be based on the collection of menu items recorded for this role, as indicated by block 210. It can be based on certain privileges for this role, as indicated by block 212, or it can be based on other criteria as well, as indicated by block 214.

Once license type identifier 122 identifies the license type needed by a user with the given role, it returns that information to administrator 102, again illustratively through a suitable user face display 104. For instance, FIG. 4A shows that the license type for the "Manager" role is an "Enterprise user license" type as shown at 257. In one embodiment, license type identifier 122 can retrieve the actual license which needs to be executed, and return that as well. Of course, this is optional. Returning the identified license type and optionally the license itself is indicated by block 216 in FIG. 4.

While FIG. 4A shows that when the user inputs a role that has already been defined, license type identifier 122 illustratively returns the type of license needed for that role, license type identifier 122 can be used as administrator 102 is creating the role as well. For instance, as administrator 102 is assigning access privileges or permissions to various menu items in ERP system 116, license type identifier 102 can, on the fly, indicate the type of license that will be needed by the user in that role. FIG. 4B shows one embodiment of a user interface display 259 that illustrates this.

It can be seen that in the embodiment shown in FIG. 4B, when administrator 102 grants access to a menu item, two columns indicate what the license type is for that menu item. When granting "view" access to a menu item, column 261 shows the type of license that will be needed. However, when granting a higher access (such as full control, or edit, create or delete access) then column 263 shows the effective user license that will be needed.

Therefore, even when administrator 102 simply selects a menu item for granting access, administrator 102 can tell, even before granting access, what type of license will be needed if the user grants different types of access. If the user grants view access, the user can see in column 261 the type of license that will be needed. If the user grants additional access, the user can see in column 263 what type of license will be needed. Thus, as administrator 102 is assigning privileges or permissions to various menu items, administrator 102 can easily take into account how those privilege assignments are affecting the types of licenses that will be needed by the users in the given role.

It can thus be seen that role creation system 106 allows an administrator 102 to quickly walk through the workflow for a user having a given role, and the securities or permissions needed for that role are quickly returned to administrator 102. Administrator 102 can then assign them to the given role and test the privileges or permissions and determine license requirements before they are committed to the business product itself. This allows the administrator 102 to assign privileges or permissions to various roles, even without technical knowledge of the ERP system, and even without detailed knowledge of the workflows required. Instead, the administrator can simply be provided with a workflow that a given role is to perform and the administrator (or substantially any user) can assign privileges or permissions for that role, in a relatively expedient way.

Figure 5:
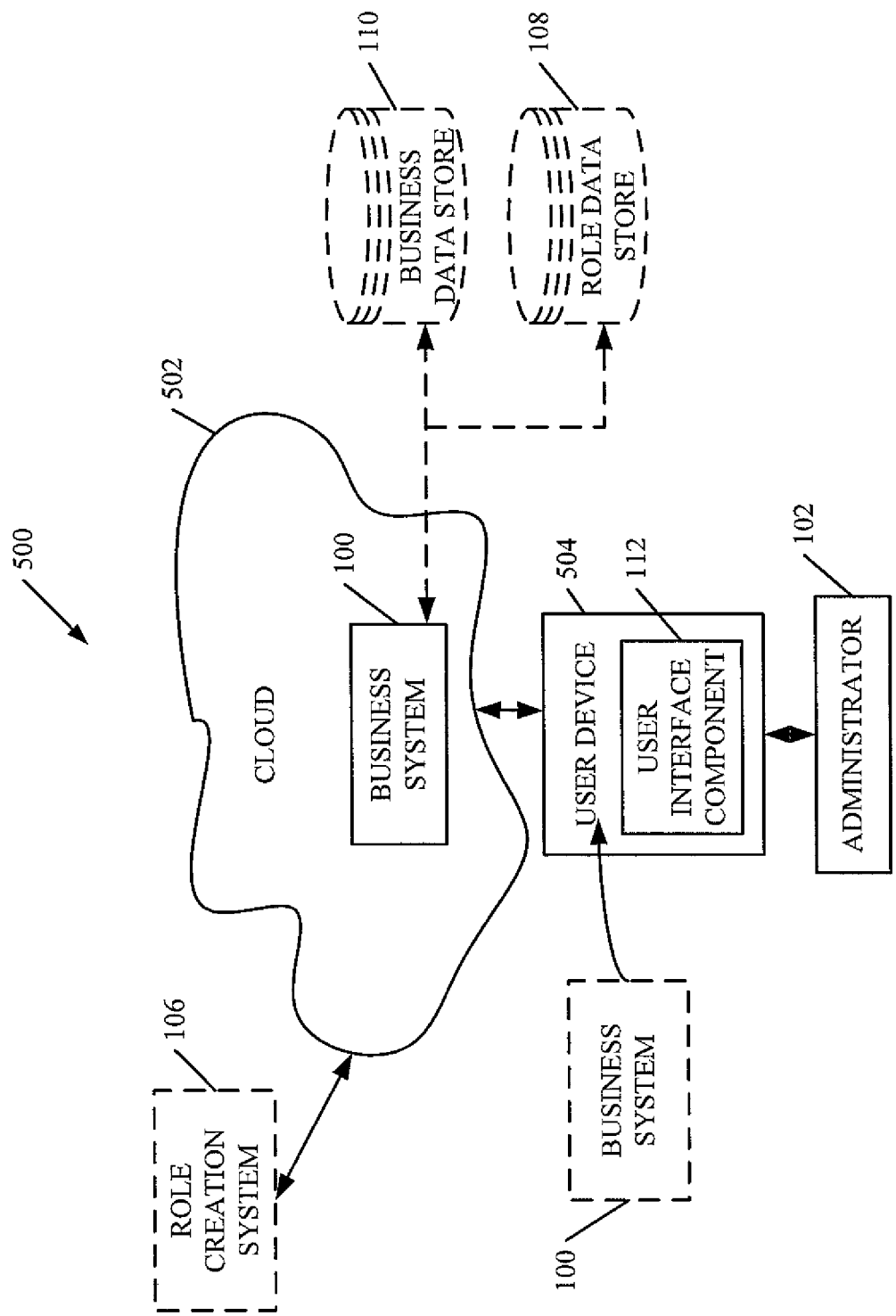
FIG. 5 is one embodiment of the business system in various architectures.

FIG. 5 is a block diagram of system 100, shown in FIG. 1, except that it is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that business system 100 is located in cloud 502 (which can be public, private, or a combination where portions are public while others are private). Therefore, administrator 102 uses a user device 504 to access those systems through cloud 502.

FIG. 5 also depicts another embodiment of a cloud architecture. FIG. 5 shows that it is also contemplated that some elements of business system 100 are disposed in cloud 502 while others are not. By way of example, data stores 108 and 110 can be disposed outside of cloud 502, and accessed through cloud 502. In another embodiment, role creation system 106 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. FIG. 5 also shows that system 100, or parts of it, can be deployed on user device 504. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
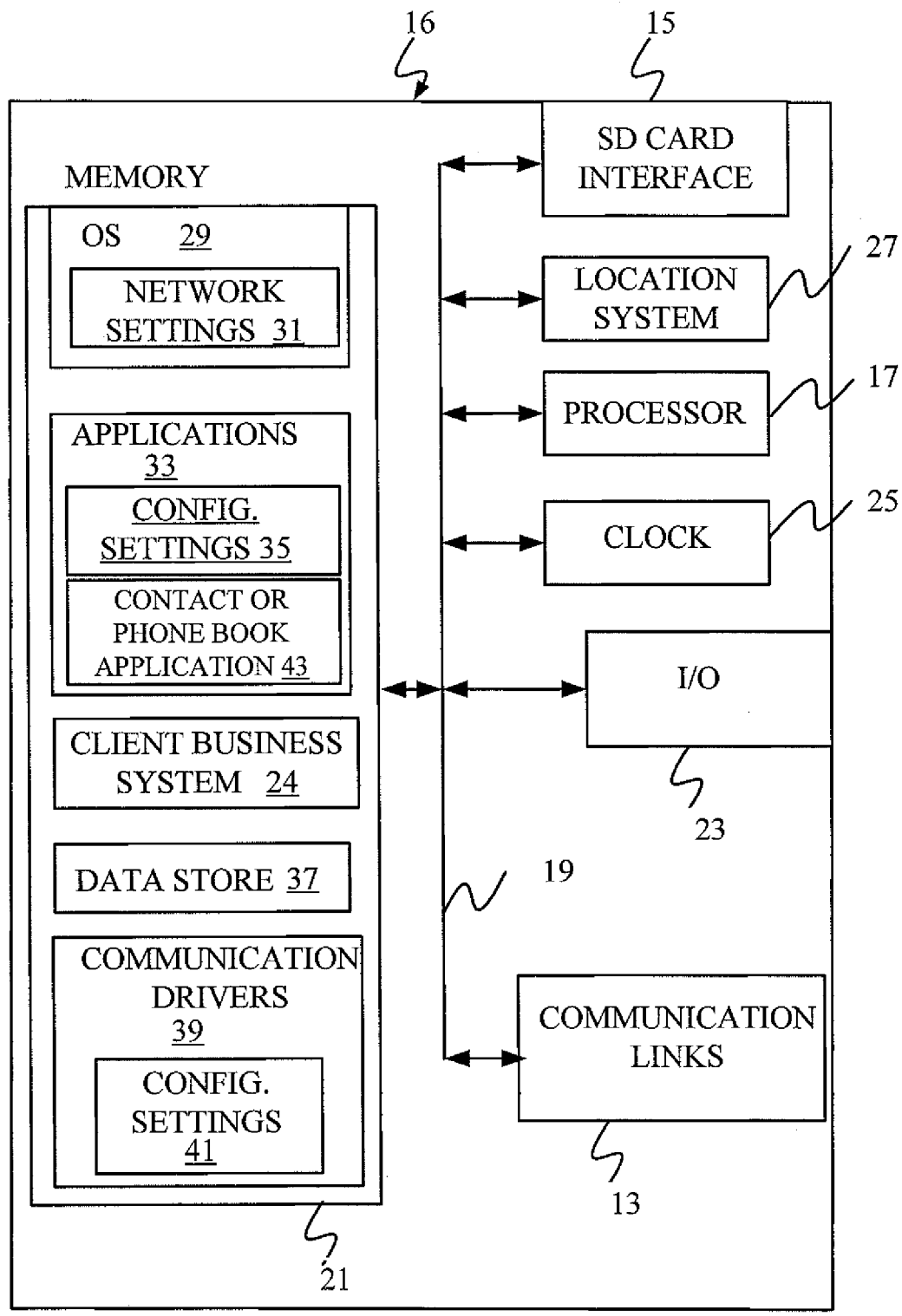
FIGS. 6-10 show embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody processor 114 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data stores 108 or 110, for example, can reside in memory 21. Similarly, device 16 can have a client business system 24 which can run various business applications or embody parts or all of business system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
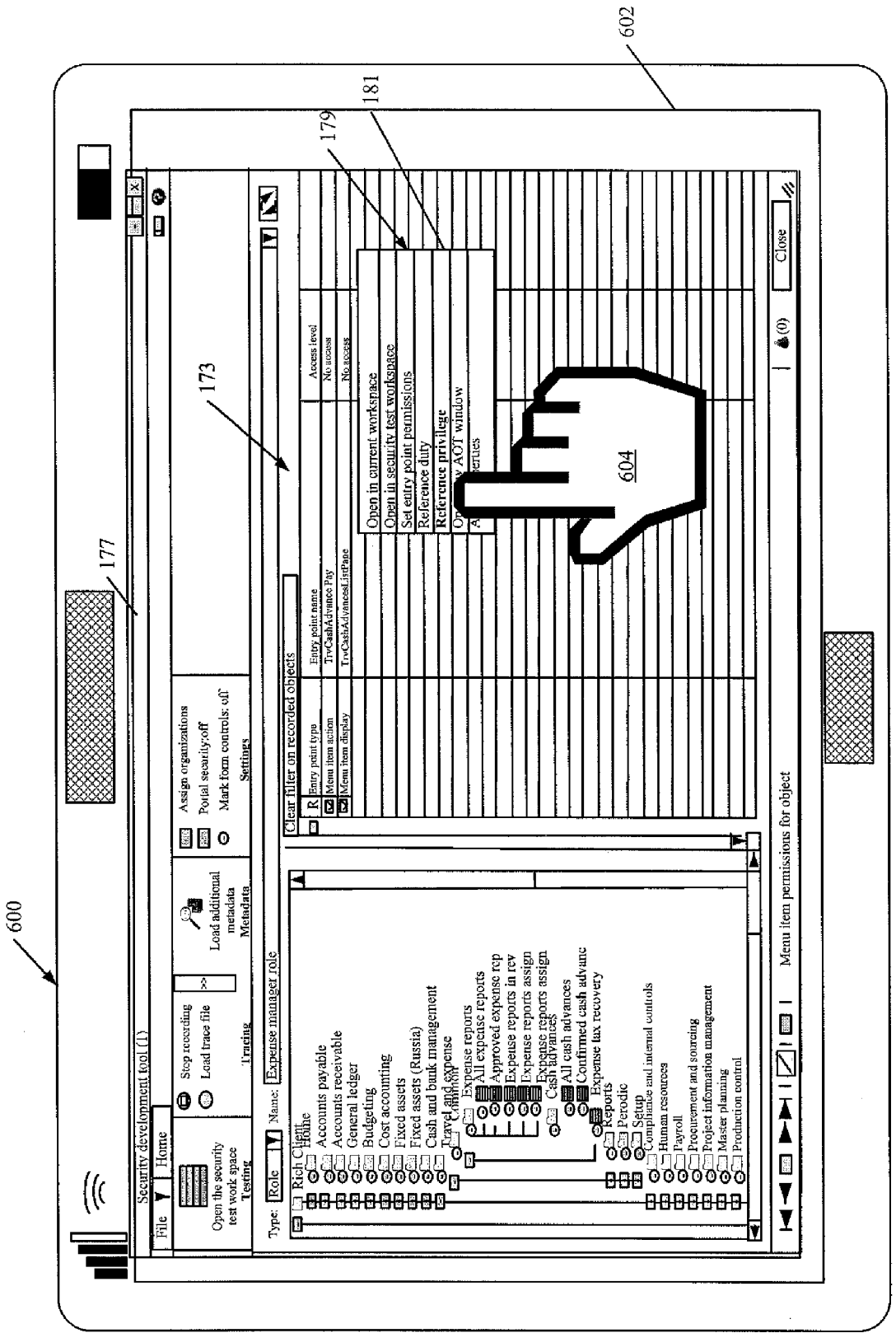
Figure 8:
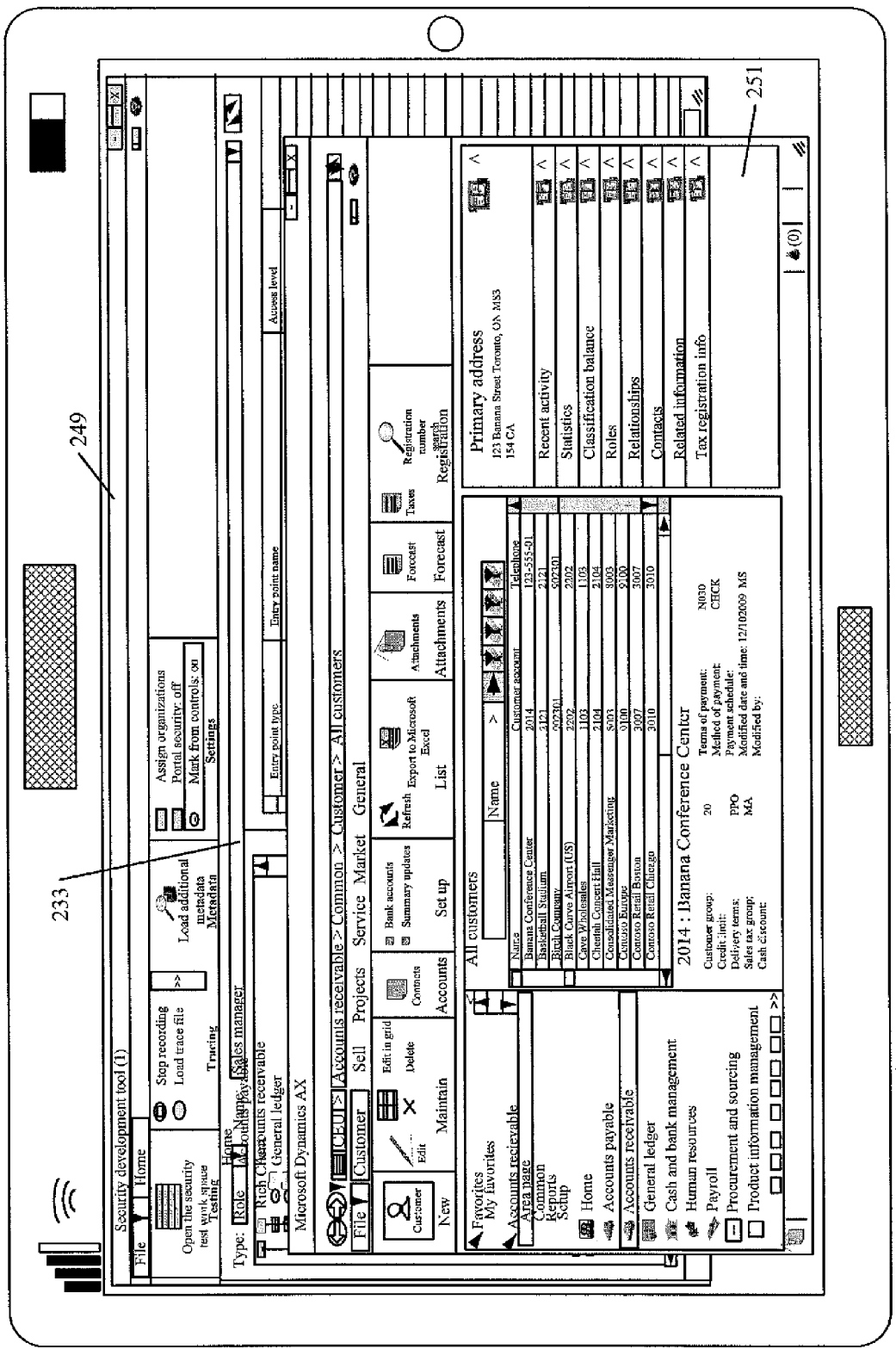

FIGS. 7 and 8 show one embodiment in which device 16 is a table computer 600. In FIG. 7, computer 600 is shown with user interface display 177 (from FIG. 2H) displayed on the display screen 602. FIG. 7 shows computer 600 with user interface display 249 (from FIG. 3D) displayed on display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
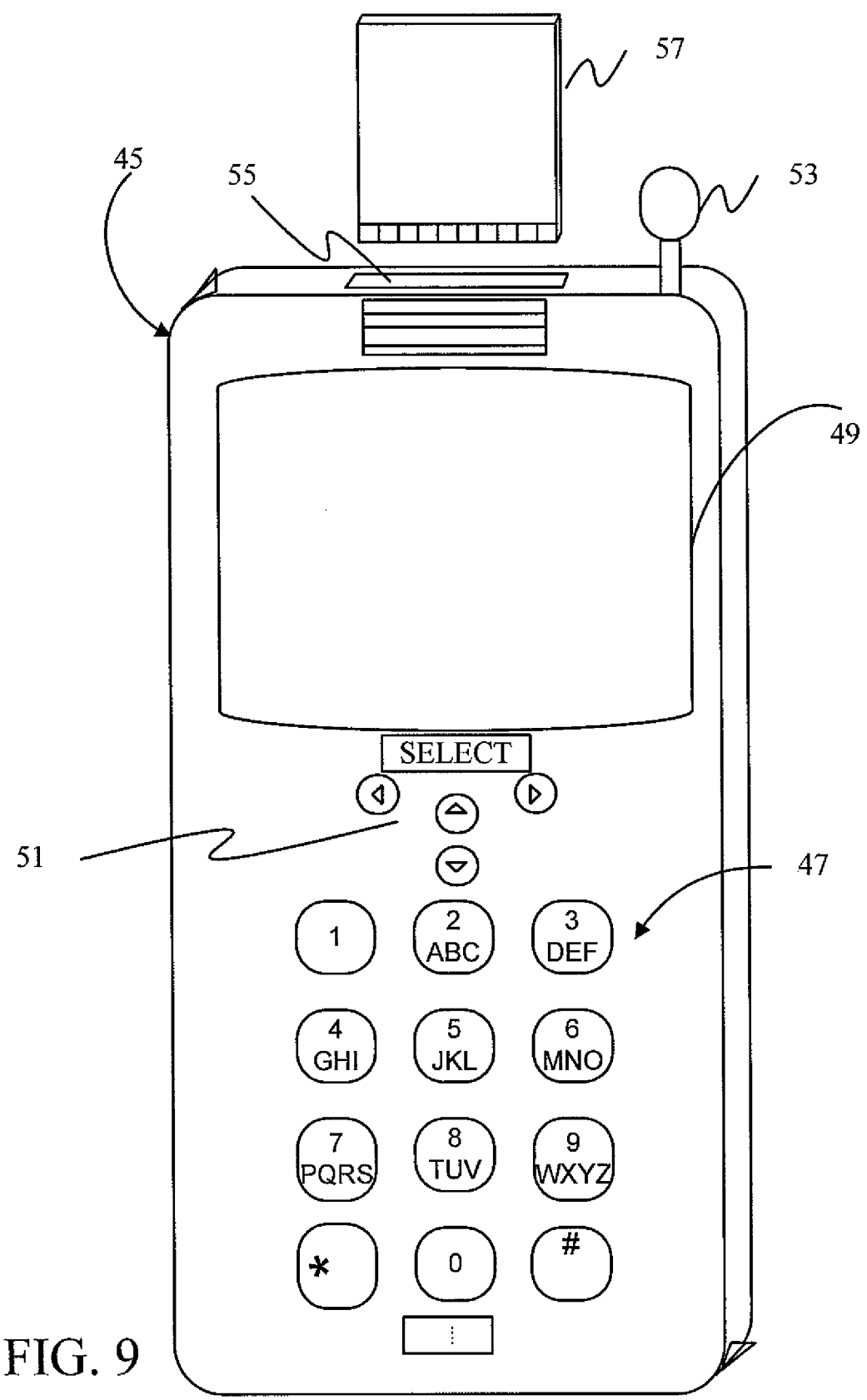
Figure 10:
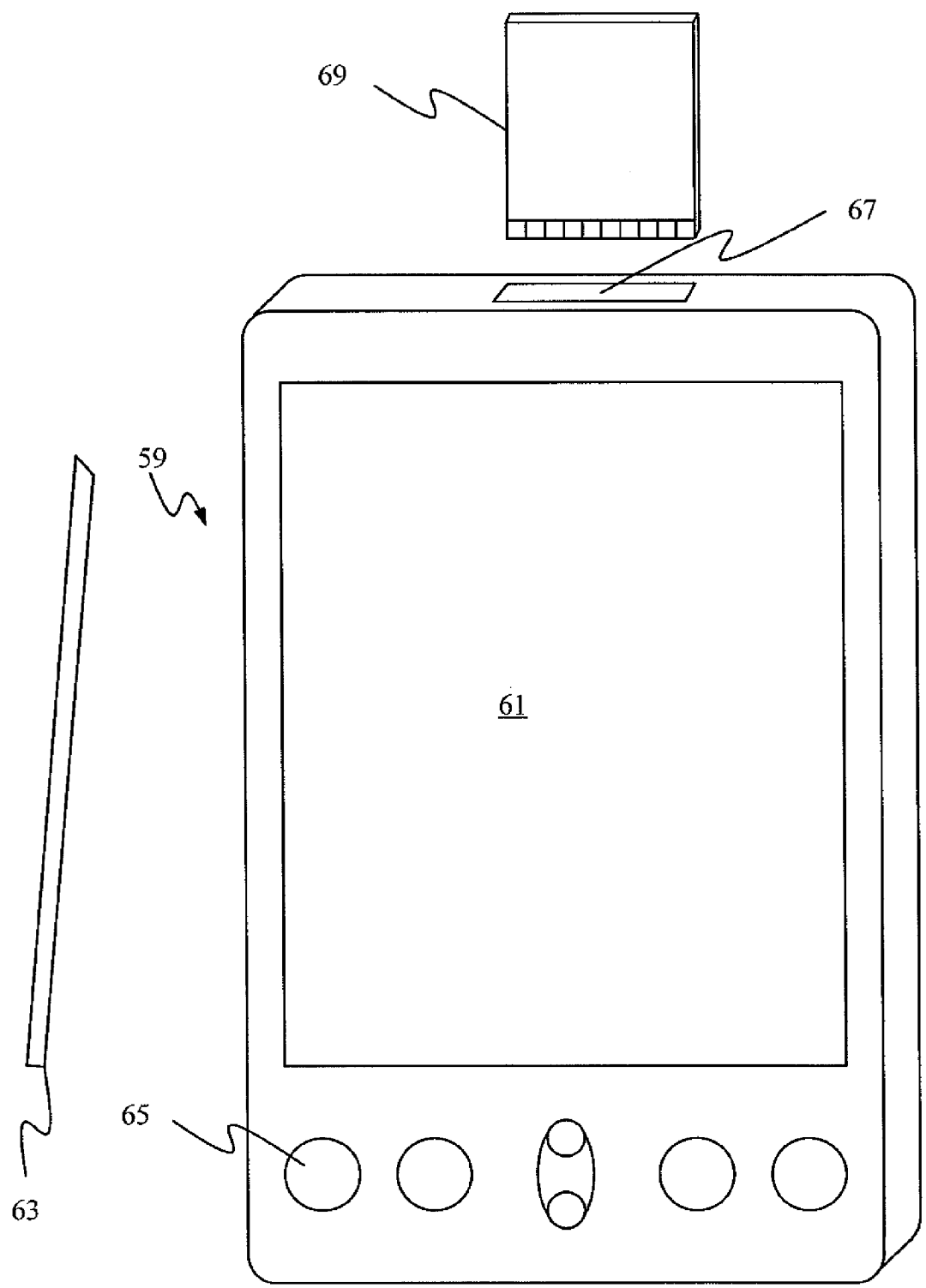

FIGS. 9 and 10 provide additional examples of devices 16 that can be used, although others can be used as well. In FIG. 9, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 11:
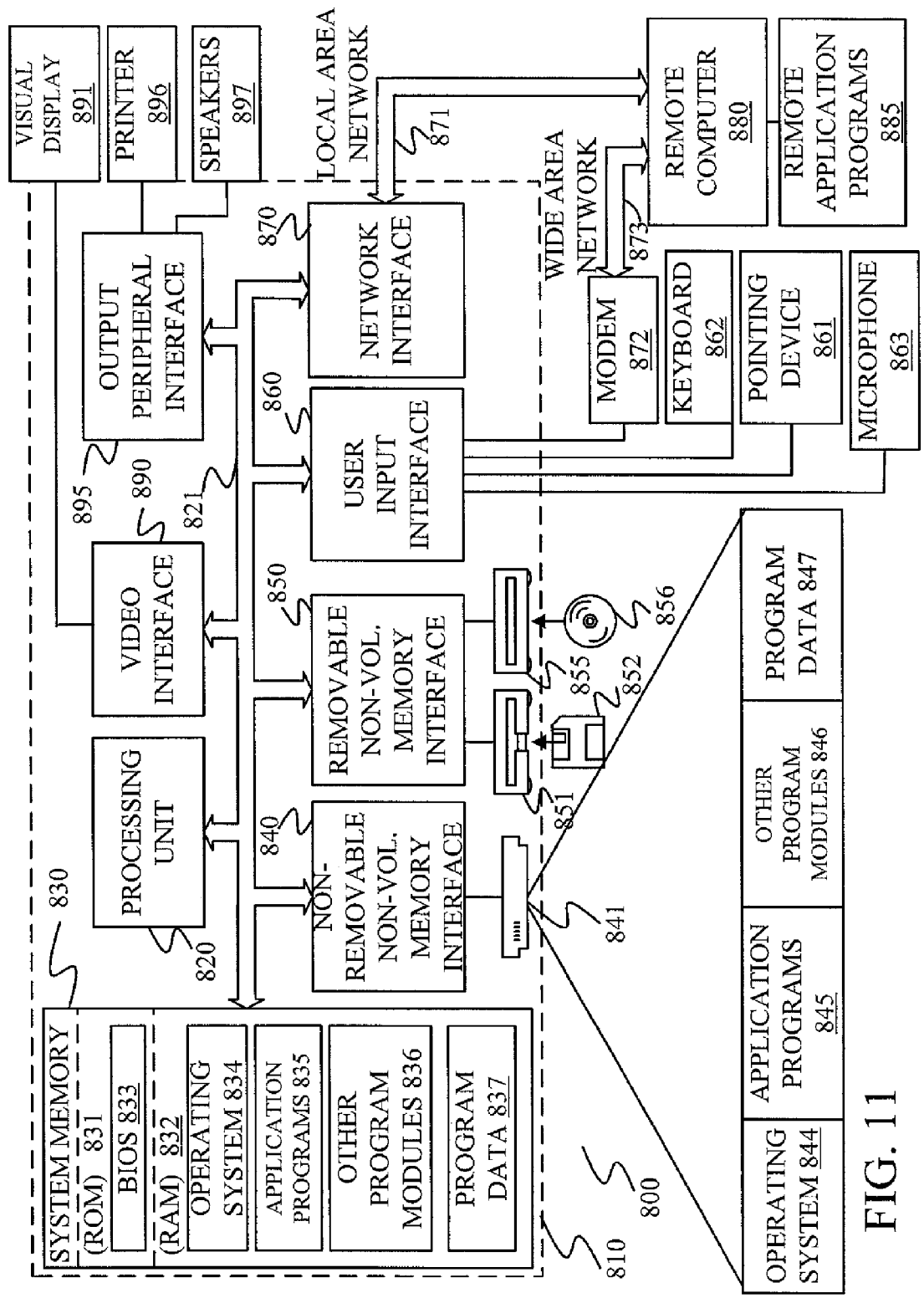
FIG. 11 shows one embodiment of a computing environment.

FIG. 11 is one embodiment of a computing environment in which system 100 (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 114), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing role-based access to information, comprising:
   accessing predefined workflow information from a data store;
   automatically identifying a workflow, based on the predefined workflow information, the workflow defining an ordered set of tasks for completing a process;
   displaying a workflow user interface display with workflow user input mechanisms in accordance with the ordered set of tasks defined by the workflow;
   receiving workflow user inputs, through the workflow user input mechanisms, indicative of a user performing the set of tasks in an information system to perform the workflow corresponding to a given role;
   automatically identifying a set of privileges needed by the user in the given role to perform the set of tasks in the workflow in the information system, wherein automatically identifying the set of privileges comprises accessing a set of predefined privilege rules that map workflow user inputs to privileges to identify the set of privileges needed to perform the set of tasks in the workflow; and
   displaying the set of privileges as corresponding to the given role.

2. The computer-implemented method of claim 1 wherein automatically identifying a set of privileges, comprises:
   recording the workflow user inputs; and
   mapping the recorded workflow user inputs to the set of privileges.

3. The computer-implemented method of claim 2 wherein receiving workflow user inputs comprises:
   receiving the workflow user inputs as simulated user interface selections in the information system requesting access to data in the information system.

4. The computer-implemented method of claim 3 wherein the user interface selections comprise at least one of menu selections, button actuations, and navigation inputs.

5. The computer-implemented method of claim 1 and further comprising:
automatically identifying a license type needed by the user in the given role based on the identified set of privileges; and
displaying the identified license type.

6. The computer-implemented method of claim 5 wherein automatically identifying the license type comprises:
accessing license type data that maps license types to privileges.

7. The computer-implemented method of claim 1 and further comprising:
automatically identifying a license type needed by the user in the given role based on the workflow user inputs received; and
displaying the identified license type.

8. The computer-implemented method of claim 1 and further comprising:
displaying test user interface displays indicative of access to the information in the information system, granted by the identified set of privileges.

9. The computer-implemented method of claim 8 wherein displaying the test user interface displays comprises:
displaying an edit user input mechanism which, when actuated, generates user input mechanisms to receive edits to the privileges; and
displaying a confirm user input mechanism which, when actuated, confirms that the set of privileges corresponds to the given role and commits the role, with the corresponding set of privileges, to the information system.

10. The computer-implemented method of claim 9 wherein committing the role to the information system comprises:
modifying the information system to include the given role and the corresponding set of privileges so the information system implements role-based access to the information in the information system for the given role based on the corresponding set of privileges.

11. The computer-implemented method of claim 8 wherein displaying the test user interface displays comprises:
displaying user interface displays from the information system with user input mechanisms visually indicated as being active or inactive based on the identified set of privileges.

12. The computer-implemented method of claim 10 wherein the information system comprises a business information system.

13. The computer-implemented method of claim 12 wherein the business information system comprises one of an enterprise resource planning system, a customer relations management system and a line-of-business application.

14. A role creation system, comprising:
a set of predefined workflow information that defines a workflow including ordered set of tasks to be completed as part of the workflow;
a set of predefined privilege rules, each privilege rule comprising a predefined mapping of a workflow portion in an information system to one or more user privileges needed for user access to data the workflow portion;
a workflow recording component displaying user interface displays that receive a set of workflow user inputs indicative of a user performing the workflow, corresponding to a given role, in the information system, and the workflow recording component stores the set of workflow user inputs;
a privilege calculation component accessing the stored set of workflow user inputs and the set of predefined privilege rules to automatically calculate a set of privileges for the given role that are needed to perform the workflow, based on the stored workflow user inputs, and the privilege calculation component displaying the identified set of privileges for the given role; and
a computer processor that is a functional part of the system and activated by the workflow recording component and the privilege calculation component to facilitate recording the workflow user inputs and identifying the set of privileges.

15. The role creation system of claim 14 wherein the workflow recording component records the workflow user inputs as user actuations of user input mechanisms on the user interface displays, the user actuations being indicative of requests to access data in the information system.

16. The role creation system of claim 15 and further comprising:
a role test component that displays test user interface displays from the information system, visually indicating which user input mechanisms are active and which are inactive.

17. The role creation system of claim 15 and further comprising:
a license type identifier that receives the identified set of privileges and displays a license type needed by the user, having the given role, to access the data in the information system and perform the workflow.

18. The role creation system of claim 14 wherein the workflow corresponds to a business workflow performed by a user in a business information system.

19. The role creation system of claim14, wherein, for each privilege rule, the portion of the workflow comprises a step in the workflow, the privilege rule mapping the step in the workflow to one or more user privileges that are needed for accessing data to perform the step in the workflow.

20. A computer readable storage medium that includes computer readable instructions which, when executed by a computer, cause the computer to perform a method of providing role-based access to information, comprising:
accessing predefined workflow information from a data store;
automatically identifying a workflow based on the predefined workflow information, the workflow defining an ordered set of tasks for completing a process;
displaying, based on the workflow, a workflow user interface display with workflow user input mechanisms;
receiving workflow user inputs as simulated user interface selections, through the workflow user input mechanisms, indicative of a user performing a set of tasks in an information system to perform the workflow corresponding to a given role;
recording the workflow user inputs;
accessing a set of privilege rules that map workflow user inputs to privileges;
automatically identifying a set of privileges needed by the user in the given role to perform the set of tasks in the workflow in the information system based on the recorded workflow user inputs and the set of privilege rules; and
displaying the set of privileges as corresponding to the given role.

* * * * *